US012185231B2

(12) United States Patent
Shi et al.

(10) Patent No.: US 12,185,231 B2
(45) Date of Patent: Dec. 31, 2024

(54) NETWORK INFORMATION REPORTING METHOD AND APPARATUS, USER EQUIPMENT, SERVICE NODE AND MEDIUM

(71) Applicant: ZTE CORPORATION, Guangdong (CN)

(72) Inventors: Xiaojuan Shi, Guangdong (CN); Li Yang, Guangdong (CN); Jianmin Fang, Guangdong (CN); He Huang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 617 days.

(21) Appl. No.: 17/607,517

(22) PCT Filed: Apr. 16, 2020

(86) PCT No.: PCT/CN2020/085052
§ 371 (c)(1),
(2) Date: Oct. 29, 2021

(87) PCT Pub. No.: WO2020/221014
PCT Pub. Date: Nov. 5, 2020

(65) Prior Publication Data
US 2022/0225224 A1  Jul. 14, 2022

(30) Foreign Application Priority Data
Apr. 29, 2019  (CN) .......................... 201910357132.2

(51) Int. Cl.
*H04W 48/18* (2009.01)
*H04W 60/00* (2009.01)
(52) U.S. Cl.
CPC .......... *H04W 48/18* (2013.01); *H04W 60/005* (2013.01)

(58) Field of Classification Search
CPC ..... H04W 48/18; H04W 48/20; H04W 48/16; H04W 60/005; H04W 60/00;
(Continued)

(56) References Cited

U.S. PATENT DOCUMENTS

2010/0278037 A1\* 11/2010 Jen .................. H04W 76/19
370/216
2014/0160974 A1\* 6/2014 Saeki ................ H04W 24/10
370/252
(Continued)

FOREIGN PATENT DOCUMENTS

CN  101867966 A  10/2010
CN  101925087 A  12/2010
(Continued)

OTHER PUBLICATIONS

European Patent Office, Partial Supplementary European Search Report dated Dec. 12, 2022, for corresponding EP application No. 20798876.7.
(Continued)

*Primary Examiner* — Brian F Shaw
(74) *Attorney, Agent, or Firm* — Li & Cai Intellectual Property (USA) Office

(57) ABSTRACT

The present application provides a network information reporting method and apparatus, a user equipment, a service node, and a medium. The network information reporting method includes: detecting, in a case where a user equipment is operating in a first-type network, a cell of a second-type network; and reporting cell network information to a service node of the first-type network, the cell network information including network information corresponding to a detected target cell of the second-type network.

17 Claims, 16 Drawing Sheets

(58) Field of Classification Search
CPC ......... H04W 36/0005; H04W 36/0058; H04W 36/0072; H04W 76/10; H04W 76/19; H04W 76/27; H04W 84/06; H04W 24/10
See application file for complete search history.

(56) References Cited

U.S. PATENT DOCUMENTS

2019/0037625 A1* 1/2019 Shih .................... H04W 72/231
2019/0053120 A1   2/2019 Park et al.

FOREIGN PATENT DOCUMENTS

| CN | 102572887 A | 7/2012 |
| CN | 105848098 A | 8/2016 |
| CN | 110536341 A | 12/2019 |
| EP | 2744272 A1 | 6/2014 |
| WO | WO2018204863 A1 | 11/2018 |

OTHER PUBLICATIONS

Nokia, et al., "Positioning in NTN", 3GPP Draft, Feb. 16, 2019.
WIPO, International Search Report issued on Jun. 30, 2020.
3GPP, "Evolved Universal Terrestrial Radio Access", 3GPP TS 36.300 V9.2.0 Dec. 31, 2009.

* cited by examiner

NETWORK INFORMATION REPORTING METHOD AND APPARATUS, USER EQUIPMENT, SERVICE NODE AND MEDIUM

CROSS-REFERENCE TO RELATED APPLICATION

The present application claims priority from the Chinese patent application No. 201910357132.2 filed with the China Patent Office on Apr. 29, 2019, the entire contents of which are incorporated in the present application by reference.

TECHNICAL FIELD

The present application relates to the field of wireless communication networks, and for example, relates to a network information reporting method and apparatus, a user equipment, a service node, and a medium.

BACKGROUND

The Fifth Generation (5G) New Radio (NR) is widely used in terrestrial communication networks, including enhanced mobile broadband (eMBB), massive machine-type communications (m-MTC), and the like. Based on terrestrial communication networks, the NR technology can be expanded to be applied in a non-terrestrial communication network. In the non-terrestrial communication network, partial or all functions of the base station will be deployed in satellites or aerial vehicles. Therefore, a cell coverage area of the non-terrestrial communication network is much larger than that of the terrestrial communication network. For example, the coverage of a beam of a low-orbit satellite may reach 100-500 km. As a result, one cell of a non-terrestrial communication network may cover multiple regions or countries, and even cover thousands of cells of terrestrial communication networks. Typically, different regions or countries have different charging policies and information control methods, and provide the user equipment (UE) with different services, etc. Therefore, in a case where a user equipment is operating in a cell of a non-terrestrial communication network with a larger coverage, the service node would not know at which region or country the user equipment is specifically located, and cannot provide corresponding effective services for the user equipment according to policies of different regions or countries, which may even result in abnormal or interrupted service.

SUMMARY

The present application provides a network information reporting method and apparatus, a user equipment, a service node, and a medium, by which a target cell where the user equipment is located can be accurately identified through the reported cell network information.

An embodiment of the present application provides a network information reporting method, including:
  detecting, in a case where a user equipment is operating in a first-type network, a cell of a second-type network; and
  reporting cell network information to a service node of the first-type network, the cell network information including network information corresponding to a detected target cell of the second-type network.

An embodiment of the present application further provides a network information reporting method, including:
  receiving network configuration information sent from a service node, the network configuration information including frequency configuration information, the frequency configuration information including configuration information of at least one target frequency;
  detecting a cell according to the network configuration information; and
  reporting cell network information to the service node, the cell network information including network information corresponding to the detected cell on the target frequency.

An embodiment of the present application further provides a network information reporting method, including:
  receiving cell network information of a target cell of a second-type network reported by a user equipment, the user equipment being operating in a first-type network; and
  reporting the cell network information to a core network.

An embodiment of the present application further provides a network information reporting method, including:
  sending network configuration information to a user equipment, the network configuration information including frequency configuration information, the frequency configuration information including configuration information of at least one target frequency;
  receiving cell network information of a target cell reported by the user equipment, the cell network information including network information corresponding to the detected cell on the target frequency; and
  reporting the cell network information to a core network.

An embodiment of the present application further provides a network information reporting apparatus, including:
  a first detection module configured to detect, in a case where a user equipment is operating in a first-type network, a cell of a second-type network; and
  a first reporting module configured to report cell network information to a service node of the first-type network, the cell network information including network information corresponding to a detected target cell of the second-type network.

An embodiment of the present application further provides a network information reporting apparatus, including:
  a configuration information receiving module configured to receive network configuration information sent from a service node, the network configuration information includes frequency configuration information including configuration information of at least one target frequency;
  a second detection module configured to detect a cell according to the network configuration information; and
  a second reporting module configured to report cell network information to the service node, the cell network information including network information corresponding to the detected cell on the target frequency.

An embodiment of the present application further provides a network information reporting apparatus, including:
  a first receiving module configured to receive, in a case where a user equipment is operating in a first-type network, cell network information of a target cell of a second-type network reported by a user equipment, and
  a third reporting module configured to report the cell network information to a core network.

An embodiment of the present application further provides a network information reporting apparatus, including:
  a configuration information sending module configured to send network configuration information to a user equipment, the network configuration information including frequency configuration information including configuration information of at least one target frequency;

a second receiving module configured to receive cell network information of a target cell reported by the user equipment, the cell network information including network information corresponding to the detected cell on the target frequency; and a fourth reporting module configured to report the cell network information to a core network.

An embodiment of the present application further provides a user equipment, including:

one or more processors; and a storage device configured to store one or more programs; wherein the one or more programs are executed by the one or more processors so that the one or more processors implement the network information reporting method as described above.

An embodiment of the present application further provides a service node, including:

one or more processors; and a storage device configured to store one or more programs; wherein the one or more programs are executed by the one or more processors so that the one or more processors implement the network information reporting method as described above.

An embodiment of the present application further provides a computer readable storage medium having a computer program stored thereon which, when executed by a processor, causes the network information reporting method as described above to be implemented.

DETAIL DESCRIPTION OF EMBODIMENTS

Figure 1:
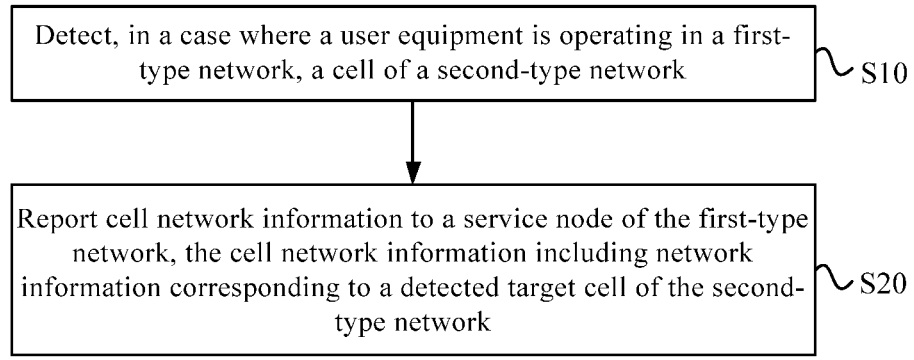
FIG. 1 is a flowchart of a network information reporting method according to an embodiment.

The present application will be described with reference to the accompanying drawings and embodiments. It will be appreciated that the specific embodiments described here are used only for the purpose of explaining the disclosure instead of limiting the disclosure. It should be noted that the embodiments of the disclosure and features therein may be combined with each other in any manner as long as they are not contradictory. It should be further noted that, for the convenience of description, only some of the structures associated with the present application are shown in the drawings, not all of them.

A cell of a first-type network with a larger coverage covers a plurality of regions or countries which have different charging policies, information control and service types. In the related art, in a case where a user equipment is operating in a cell of a first-type network, the service node of the first-type network cannot know the region or country where the user equipment is specifically located, rendering that the service node cannot provide targeted services for the user equipment.

In a cell of the first-type network with a larger coverage, there is typically distributed at least one cell of a second-type network with a smaller coverage. Aiming at the problem that due to the larger coverage of the first-type network, the region or country where the user equipment is located cannot be identified, the user equipment in this embodiment reports the network information of a target cell of a second-type network with a smaller coverage to the service node, so that the target cell of the second-type network where the user equipment is specifically located is accurately identified within the first-type network, thereby identifying the region or country where the user equipment is located accurately, and enabling the service node to provide effective services for the user equipment according to different regions or countries and the like.

In this embodiment, there is provided a network information reporting method applied to a UE. FIG. 1 is a flowchart of a network information reporting method according to an embodiment. As shown in FIG. 1, the method provided in this embodiment includes steps S10 to S20.

At step S10, detecting, in a case where a user equipment is operating in a first-type network, a cell of a second-type network.

In an embodiment, the UE operating in the first-type network means that the UE resides in the first-type network or establishes Radio Resource Control (RRC) (RRC connection) with the first-type network. Detecting the cell of the second-type network means that the UE performs cell selection or reselection on the cells of the second-type network, and takes the cell of the second-type network obtained through the cell selection or reselection as the detected target cell of the second-type network. The user equipment acquires network information of the target cell from a broadcast message of the target cell and reports the network information of the target cell as the cell network information to the service node of the first-type network. The cell selection and reselection follow rules for cell selection or reselection in the existing relevant protocols.

At step S20, reporting cell network information to a service node of the first-type network, the cell network information including network information corresponding to a detected target cell of the second-type network.

In an embodiment, the first-type network is a Non-Terrestrial Network (NTN) and the second-type network is a Terrestrial Network (TN).

In an embodiment, the cell network information includes at least one of a Public Land Mobile Network (PLMN) identity, a Tracking Area Identity (TAI), a Cell Global Identity (CGI), and a Radio Access Node Area Code (RAN-AreaCode).

In an embodiment, the UE may detect the cell of the second-type network in any one of the following cases: the UE is registered in the first-type network; the UE determines that the cell network information needs to be updated; the UE establishes RRC (RRC connection) in the first-type network; the UE resumes RRC in the first-type network; the UE executes switching or synchronous reconfiguration in the first-type network; the UE performs RRC reestablishment in the first-type network; and the UE executes reporting of the location information in the first-type network.

In an embodiment, the UE may report cell network information to the service node of the first-type network via at least one of: an RRC setup complete message; an RRC resume complete message; an uplink information transfer message; an RRC reconfiguration complete message; an RRC reestablishment complete message; an RRC assistance information message; and a new RRC message for reporting the second-type network information.

In an embodiment, the UE directly contains the cell network information in any one of the above messages to report to the service node, or contains the cell network information in a Non-Access Stratum (NAS) message, and then contains the NAS message in any one of the above messages to report to the service node. after receiving the cell network information reported by the UE, the service node sends the cell network information to the core network where the core network makes a decision regarding the cell network information, so as to provide effective services for the UE.

In an embodiment, the UE is in an RRC_IDLE state, and the step of reporting cell network information to the service node of the first-type network includes: sending, in a case where the user equipment is registered in the first-type network or the cell network information is in a to-be-updated state, a registration request to the service node of the first-type network, and reporting the cell network information through the registration request.

Figure 2:
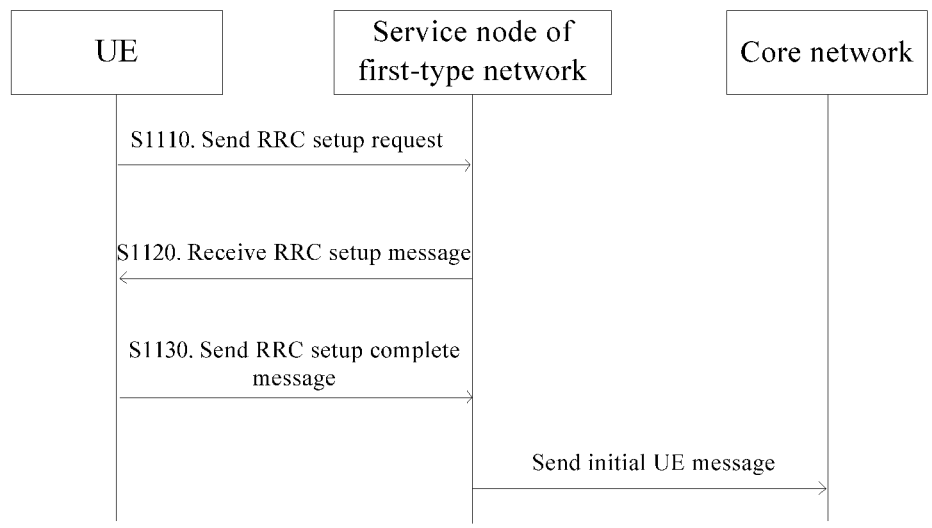
FIG. 2 is a flowchart illustrating implementation of reporting cell network information according to an embodiment.

FIG. 2 is a flowchart illustrating implementation of reporting cell network information according to an embodiment. In this embodiment, the UE is in an RRC_IDLE state. In a case where the user equipment is registered in the first-type network or the cell network information is in a to-be-updated state, or that the user equipment initiates RRC setup in the first-type network, the UE sends a registration request to the service node of the first-type network, and reports the cell network information through the registration request. As shown in FIG. 2, the step of reporting cell network information to the service node of the first-type network includes steps S1110 to S1130.

At step S1110, sending an RRC setup request to the service node of the first-type network.

At step S1120, receiving an RRC setup message fed back from the service node of the first-type network.

At step S1130, sending an RRC setup complete message to the service node of the first-type network. The setup complete message includes an NAS message containing the cell network information. The NAS message may be a registration request.

In an embodiment, after receiving the RRC setup complete message sent from the UE, the service node sends an initial UE message to the core network. The initial UE message includes an NAS message containing the cell network information.

In an embodiment, the RRC setup complete message contains the cell network information. The cell network information is directly reported to the service node through the RRC setup complete message, and the service node sends the initial UE message containing the cell network information to the core network.

In an embodiment, before sending the registration request to the service node of the first-type network, the method further includes: acquiring a first system message of the target cell of the second-type network, the first system message containing at least one of a public land mobile network identity, a tracking area identity, a cell global identity and a radio access node area code; and determining that the cell network information is in the to-be-updated state according to the first system message. In this embodiment, the UE acquires the first system message from the target cell obtained by cell selection or reselection, and determines whether the cell network information is in a to-be-updated state according to the acquired first system message. The UE may determine whether the PLMN, the TAI, the CGI or the RAN-AreaCode of the target cell is changed compared with a historical target cell according to the first system message, and determine, in a case where at least one of the PLMN, the TAI, the CGI and the RAN-AreaCode is changed, that the cell network information is in a to-be-updated state.

Figure 3:
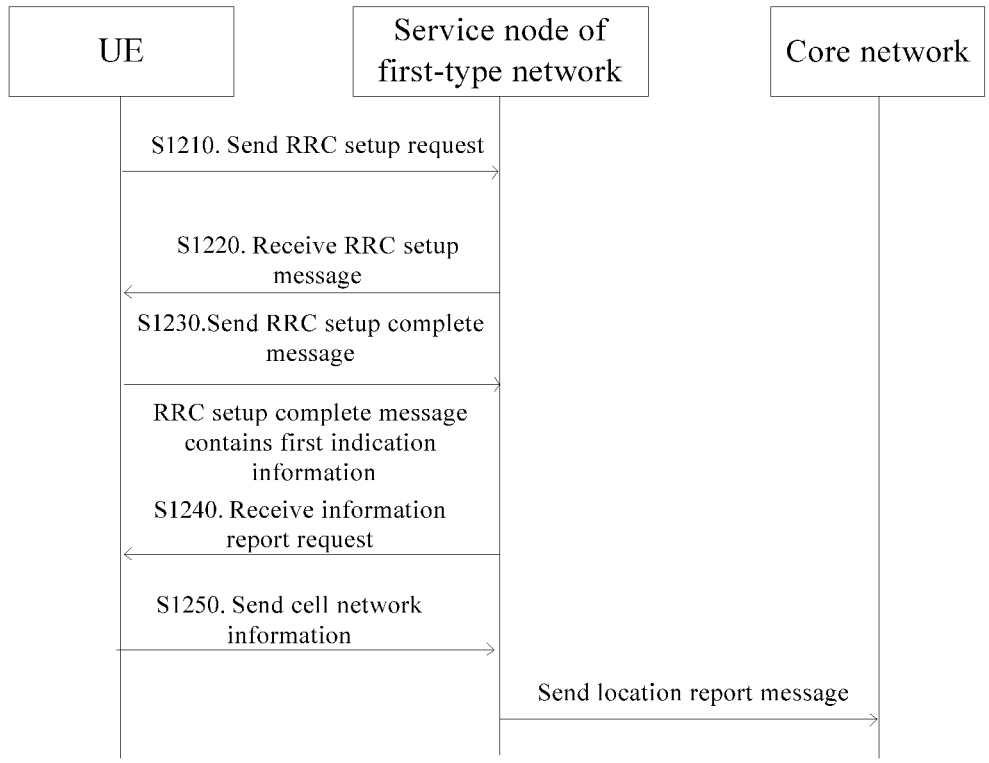
FIG. 3 is a flowchart illustrating implementation of reporting cell network information according to an embodiment.

FIG. 3 is a flowchart illustrating implementation of reporting cell network information according to an embodiment. In this embodiment, the service node feeds back the information report request to the user equipment after receiving first indication information. As shown in FIG. 3, the step of reporting cell network information to the service node of the first-type network includes steps S1210 to S1250.

At step S1210, sending an RRC setup request to the service node of the first-type network.

At step S1220, receiving an RRC setup message fed back from the service node of the first-type network.

At step S1230, sending an RRC setup complete message to the service node of the first-type network. The RRC setup complete message contains first indication information that is configured to indicate that the user equipment has the cell network information.

At step S1240, receiving an information report request regarding the first indication information fed back from the service node of the first-type network.

At step S1250, sending the cell network information to the service node of the first-type network according to the information report request.

In an embodiment, after receiving the cell network information reported by the UE, the service node sends a location report message to a core network. The location report message contains the cell network information.

In an embodiment, before the UE receives the information report request regarding the first indication information fed back from the service node of the first-type network, the method further includes: receiving security configuration information from the service node. The service node sends the security configuration information before sending an information report request to the UE, thereby ensuring transmission security of the cell network information.

Figure 4:
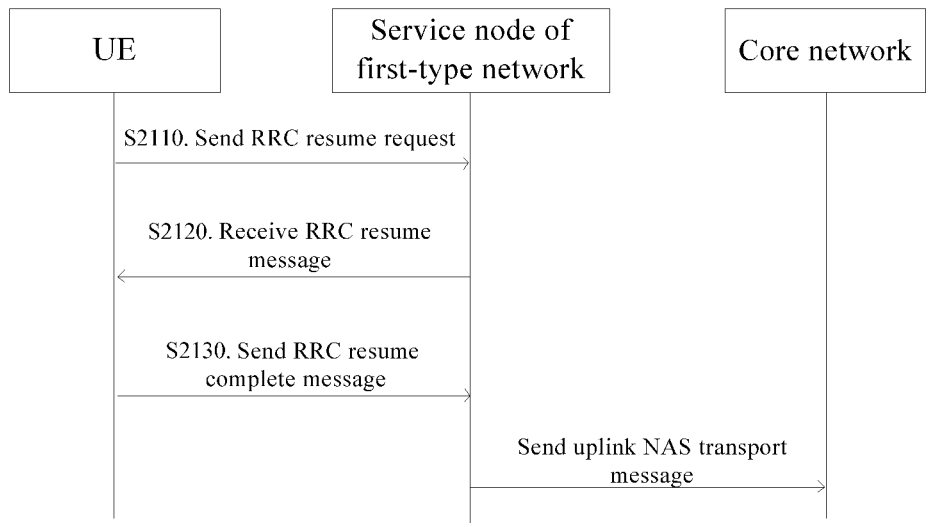
FIG. 4 is a flowchart illustrating implementation of reporting cell network information according to an embodiment.

FIG. 4 is a flowchart illustrating implementation of reporting cell network information according to an embodiment. In this embodiment, the UE is in an inactive state (RRC_INACTIVE) and resides in the first-type network. When the cell network information is in a to-be-updated state, the UE sends a registration request to the service node of the first-type network, and reports the cell network information through the registration request. As shown in FIG. 4, the step of reporting cell network information to the service node of the first-type network includes steps S2110 to S2130.

At step S2110, sending an RRC resume request to the service node of the first-type network.

At step S2120, receiving an RRC resume message fed back from the service node of the first-type network.

At step S2130, sending an RRC resume complete message to the service node of the first-type network. the RRC resume complete message includes an NAS message containing the cell network information.

In this embodiment, after receiving the RRC setup complete message sent from the UE, the service node sends an uplink NAS transport message to the core network. The uplink NAS transport message includes an NAS message containing the cell network information.

Figure 5:
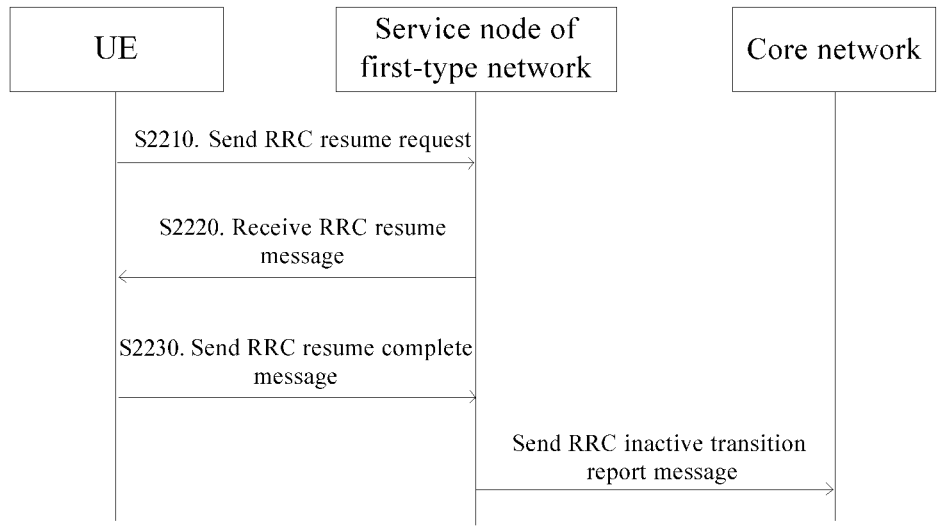
FIG. 5 is a flowchart illustrating implementation of reporting cell network information according to an embodiment.

FIG. 5 is a flowchart illustrating implementation of reporting cell network information according to an embodiment. In this embodiment, the UE is in an RRC_INACTIVE state, and reports the cell network information to the service node of the first-type network during resuming of the RRC. As shown in FIG. 5, the step of reporting cell network information to the service node of the first-type network includes steps S2210 to S2230.

At step S2210, sending an RRC resume request to the service node of the first-type network.

At step S2220, receiving an RRC resume message fed back from the service node of the first-type network.

At step S2230, sending an RRC resume complete message to the service node of the first-type network. The RRC resume complete message contains the cell network information.

In this embodiment, after receiving the RRC setup complete message sent from the UE, the service node sends an RRC inactive transition report message to the core network. The RRC inactive transition report message contains the cell network information. The cell network information may be included in UE location information in the RRC inactive transition report message. The RRC inactive transition report message is configured to inform the core network of the UE entering or leaving the RRC_INACTIVE state depending on the network implementation.

Figure 6:
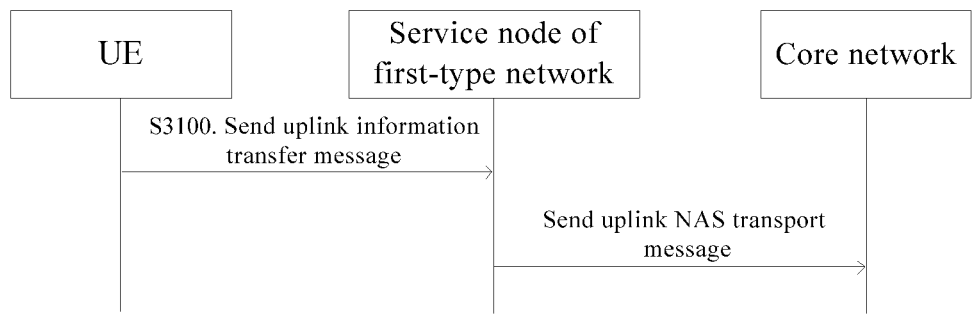
FIG. 6 is a flowchart illustrating implementation of reporting cell network information according to an embodiment.

FIG. 6 is a flowchart illustrating implementation of reporting cell network information according to an embodiment. In this embodiment, the UE is in an RRC_CONNECTED state, and when the cell network information is in a to-be-updated state, the UE sends a registration request to the service node of the first-type network, and reports the cell network information through the registration request. The cell network information in a to-be-updated state means that when the UE performs cell selection or reselection in the second-type network, it is determined that the cell network information needs to be updated according to the system message acquired from the selected target cell. As shown in FIG. 6, the step of reporting cell network information to the service node of the first-type network includes step S3100.

At step S3100, sending an uplink information transfer (UL information transfer) message to the service node of the first-type network. The uplink information transfer message is used by the UE to send an NAS message to the serving cell when the UE is in the RRC_CONNECTED state. The uplink information transfer message includes the NAS message. The NAS message contains the cell network information.

In this embodiment, after receiving the uplink information transfer message sent from the UE, the service node sends an uplink NAS transport message to the core network. The uplink NAS transport message includes the NAS message. In an embodiment, the NAS message includes a registration request.

Figure 7:
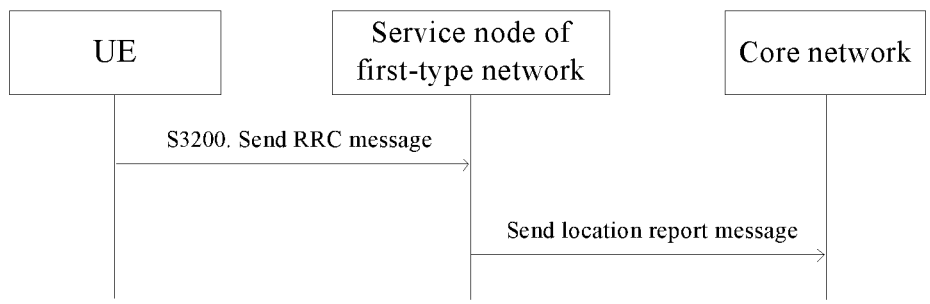
FIG. 7 is a flowchart illustrating implementation of reporting cell network information according to an embodiment.

FIG. 7 is a flowchart illustrating implementation of reporting cell network information according to an embodiment. In this embodiment, the UE is in an RRC_CONNECTED state, and reports the cell network information through an RRC message. The RRC message may be a UE assistance information message, or a new RRC message for reporting the cell network information. As shown in FIG. 7, the step of reporting cell network information to the service node of the first-type network includes step 3200.

At step S3200, sending an RRC message to the service node of the first-type network. The RRC message contains the cell network information.

In this embodiment, when the cell network information is in the to-be-updated state, or when the user equipment reports the location information in the first-type network, the UE sends a radio resource control message to the service node of the first-type network. The radio resource control message contains the cell network information. After receiving the RRC message sent from the UE, the service node sends a location report to the core network. The location report message contains the cell network information.

Figure 8:
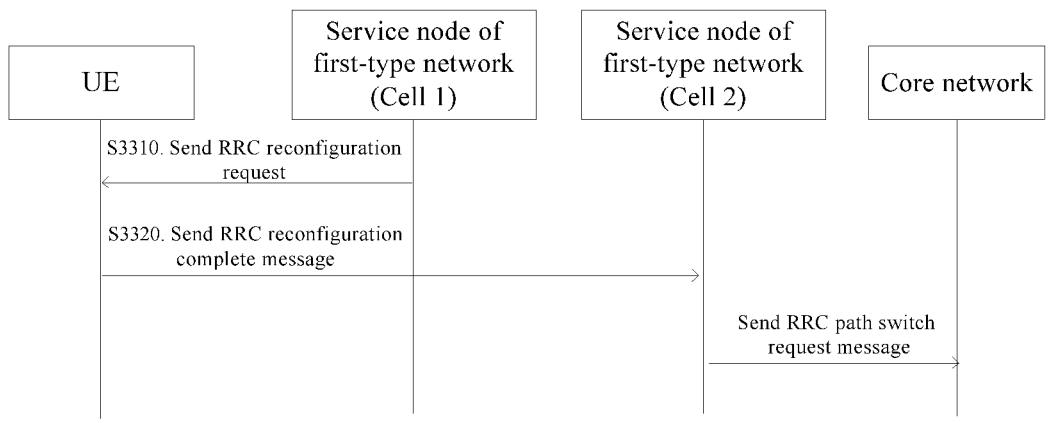
FIG. 8 is a flowchart illustrating implementation of reporting cell network information according to an embodiment.

FIG. 8 is a flowchart illustrating implementation of reporting cell network information according to an embodiment. In this embodiment, the UE is in an RRC_CONNECTED state, and reports the cell network information to the service node during a switching process or a synchronous reconfiguration process. As shown in FIG. 8, the step of reporting cell network information to the service node of the first-type network includes steps 3310 to S3320.

At step S3310, receiving an RRC reconfiguration message sent from the first-type network. The RRC reconfiguration message indicates that the UE is switched from one NTN cell to another NTN cell.

At step S3320, sending an RRC reconfiguration complete message to the service node of the first-type network. The RRC reconfiguration complete message contains the cell network information. The cell network message is acquired by the UE from a system message of a target cell, and the target cell is a cell of the second-type network selected by the UE in the cell selection or reselection in the second-type network.

In this embodiment, after receiving the RRC reconfiguration complete message, the service node of the first-type network sends a path switch request message to the core network. The path switch request message contains the cell network information.

Figure 9:
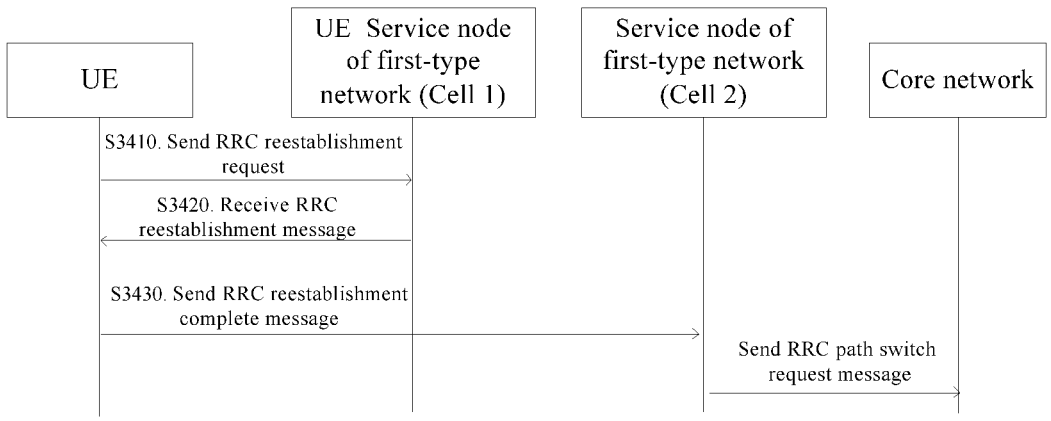
FIG. 9 is a flowchart of a cell network information reporting method according to an embodiment.

FIG. 9 is a flowchart illustrating implementation of reporting cell network information according to an embodiment. In this embodiment, the UE is in an RRC_CONNECTED state, and reports the cell network information during RRC reestablishment. As shown in FIG. 9, the step of reporting cell network information to the service node of the first-type network includes steps S3410 to S3430.

At step S3410, sending an RRC reestablishment request to the service node of the first-type network.

At step S3420, receiving an RRC reestablishment message fed back from the service node of the first-type network.

At step S3430, sending an RRC reestablishment complete message to the service node of the first-type network. The RRC reestablishment complete message contains the cell network information.

In an embodiment, after receiving the RRC reestablishment complete message, the service node of the first-type network sends a path switch request message to the core network. The path switch request message contains the cell network information.

In an embodiment, when the UE is operating in the first-type network, the behavior of detecting the cell of the second-type network may be controlled by the first-type network. Before detecting the cell of the second-type network, the method further includes: receiving network configuration information sent from the first-type network. The network configuration information includes at least one of indication information for reporting the cell network information, frequency configuration information and time configuration information.

The frequency configuration information includes configuration information of at least one frequency that is configured to instruct a user equipment to detect the target cell of the second-type network on the frequency configured by the frequency configuration information. The time configuration information is timer configuration information or time interval configuration information that is configured to instruct a user equipment to periodically detect the target cell of the second-type network.

In an embodiment, the time configuration information is a timer configuration information (e.g., configuring a timer with a duration of x seconds) or time interval configuration information (e.g., configuring a time interval with a value of y seconds).

In an embodiment, the first information is indication information for reporting the cell network information, and is configured to instruct a UE to report the cell network information. The second information is frequency configuration information, and the third information is time configuration information.

In an embodiment, the network configuration information includes the first information. After receiving the first information, the UE detects a cell of the second-type network, i.e., performs cell selection or reselection on the cells of the second-type network.

In an embodiment, the network configuration information includes the first information and the second information. After receiving the first information and the second information, the UE detects the cell of the second-type network according to at least one frequency configured in the second information, i.e., performs cell selection or reselection on at least one frequency configured in the second information.

In an embodiment, the network configuration information includes the first information and the third information. After receiving the first information and the third information, the UE periodically detects the cell of the second-type network according to the third information, i.e., periodically performs cell selection or reselection regarding the second network according to the third information.

In an embodiment, the network configuration information includes the second information. After receiving the second information, the UE performs cell selection or reselection on at least one frequency configured in the second information.

In an embodiment, the network configuration information includes the second information and the third information.

After receiving the second information and the third information, the UE periodically detects at least one frequency configured in the second information according to the third information, i.e., periodically performs cell selection or reselection on at least one frequency configured in the second information according to the third information.

In an embodiment, the network configuration information includes the first information, the second information and the third information. After receiving the first information, the second information and the third information, the UE periodically detects at least one frequency configured in the second information according to the third information, i.e., periodically performs cell selection or reselection on at least one frequency configured in the second information according to the third information.

In an embodiment, the UE operating in the first-type network includes: an RRC_IDLE or RRC_INACTIVE state which indicates that the UE resides in the first-type network, and an RRC_CONNECTED state which indicates that the UE establishes an RRC with the first-type network.

In an embodiment, the second-type network may be any one or combination of 2G, 3G, 4G and 5G terrestrial communication networks. The first-type network may send network configuration information to the UE through a system message or an RRC dedicated message (e.g., an RRC reestablishment message, an RRC setup message, an RRC release message, an RRC resume message, an RRC reestablishment message, etc.).

In the network information reporting method according to this embodiment, when the UE is operating in the first-type network, the UE detects a cell of the second-type network, reports cell network information in the first-type network. By reporting cell network information in the first-type network, the problem that the first-type network has a wide deployment range but cannot implement different control strategies for users according to different national boundaries or geographic locations can be solved, the country, the geographic location, the network location and the like where the UE is located can be determined in a smaller range within the wide coverage of the first-type network, and thus, different control strategies for the users can be implemented according to different national boundaries or geographic locations.

Figure 10:
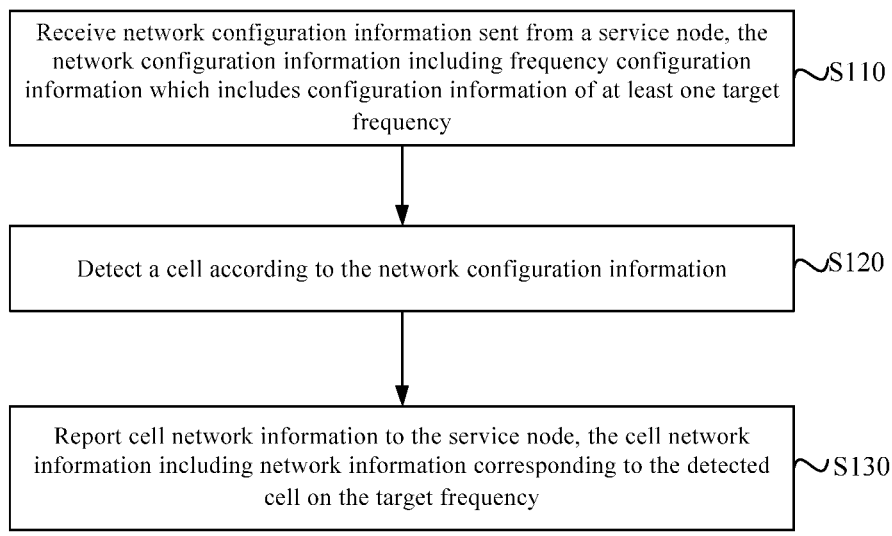
FIG. 10 is a flowchart illustrating implementation of reporting cell network information according to an embodiment.

An embodiment of the present application further provides a network information reporting method applied to a UE. FIG. 10 is a flowchart of a network information reporting method according to an embodiment. As shown in FIG. 10, the method provided in this embodiment includes steps S110 to S130.

At step S110, receiving network configuration information sent from a service node, the network configuration information including frequency configuration information including configuration information of at least one target frequency.

At step S120, detecting a cell according to the network configuration information.

At step S130, reporting cell network information to the service node, the cell network information including network information corresponding to the detected cell on the target frequency.

In an embodiment, the network configuration information may further include at least one of indication information for reporting the cell network information, and time configuration information.

In an embodiment, the UE receives the network configuration information by receiving at least one of a system message, an RRC release message, and an RRC reconfiguration message.

In an embodiment, the UE reports the cell network information of the at least one target cell on the at least one target frequency to the service node when:
the UE determines that the cell network information needs to be reported according to the received time configuration information; the UE initiates RRC setup; the UE initiates RRC resume; and the UE sends a measurement report to the service node.

In an embodiment, determining that the cell network information needs to be reported according to the received time configuration information includes: determining that the cell network information needs to be reported after the time set by the timer or the time interval configured by the interval time configuration information is expired.

In an embodiment, when the UE initiates RRC setup, the cell network information of the at least one target cell on the at least one target frequency may be reported in the RRC setup complete message or in the message for reporting the UE information.

In an embodiment, when the UE initiates RRC resume, the cell network information of the at least one target cell on the at least one target frequency maybe reported in the RRC resume complete message or in the message for reporting the UE information.

In an embodiment, after receiving the cell network information of the at least one target cell on the at least one target frequency, the base station sends the cell network information of the at least one target cell to the core network.

In an embodiment, the cell network information includes at least one of a Public Land Mobile Network (PLMN) identity, a Tracking Area Identity (TAI), a Cell Global Identity (CGI), and a Radio Access Node Area Code (RAN-AreaCode).

Figure 11:
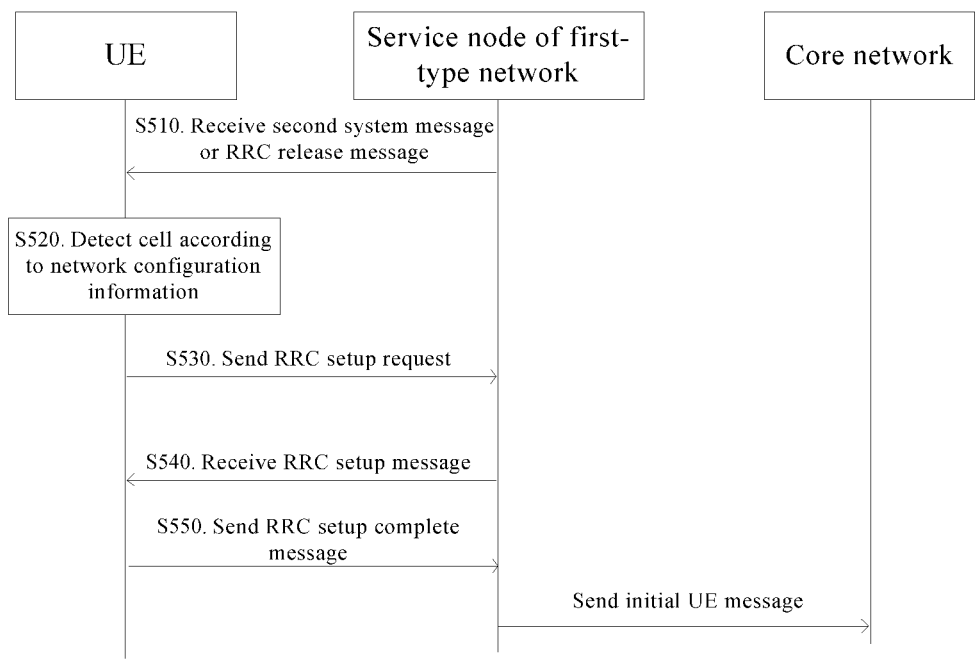
FIG. 11 is a flowchart illustrating implementation of reporting cell network information according to an embodiment.

FIG. 11 is a flowchart illustrating implementation of reporting cell network information according to an embodiment. In this embodiment, the UE receives the network configuration information from a system message or an RRC release message. The network configuration information includes frequency configuration information and time configuration information. The time configuration information is a timer configuration information (e.g., configuring a timer with a duration of x seconds) or time interval configuration information (e.g., configuring a time interval with a value of y seconds).

In an embodiment, the network configuration information further includes indication information for reporting the cell network information. The indication information for reporting the cell network information may be configured separately for each frequency in the frequency configuration information; or may be configured uniformly for all frequencies in the frequency configuration information, i.e., only one piece of indication information for reporting the cell network information is configured for the at least one frequency configured in the frequency configuration information.

As shown in FIG. 11, the step of reporting cell network information to the service node of the first-type network includes steps S510 to S550.

At step S510, receiving a second system message sent from the service node, the second system message containing the network configuration information, or, receive an RRC release message sent from the service node, the RRC release message containing network configuration information that includes time configuration information and the frequency configuration information.

At step S520, detecting a cell according to the network configuration information.

At step S530, initiating an RRC setup request to a service node.

At step S540, receiving an RRC setup message fed back from the service node.

At step S550, sending an RRC setup complete message to the service node, the RRC setup complete message containing the cell network information.

In this embodiment, the UE is in an RRC_IDLE state and resides in the first-type network (such as an NTN network), and the at least one target frequency configured by the frequency configuration information is a frequency used in the second-type network (such as a TN network). After receiving the network configuration information, the UE periodically measures the at least one target frequency according to the time configuration information, and, acquires, in a case where at least one target cell on the at least one target frequency is measured, a system message of the at least one target cell.

In this embodiment, the UE initiates an RRC setup process according to the time configuration information or service requirements, and reports the cell network information during the RRC setup process. The UE, when determining that the cell network information needs to be reported according to the time configuration information, initiates the RRC setup process. In an embodiment, when the time configuration information is timer configuration information and the timer is expired, and the UE needs to report the cell network information of the at least one target cell, the UE initiates the RRC setup process. When the time configuration information is the time interval configuration information, and the UE needs to report the cell network information of the at least one target cell, the RRC setup process is initiated at each time interval.

In an embodiment, after receiving the cell network information reported by the UE, the service node sends an initial UE message to the core network. The initial UE message contains the cell network information of the at least one target cell.

Figure 12:
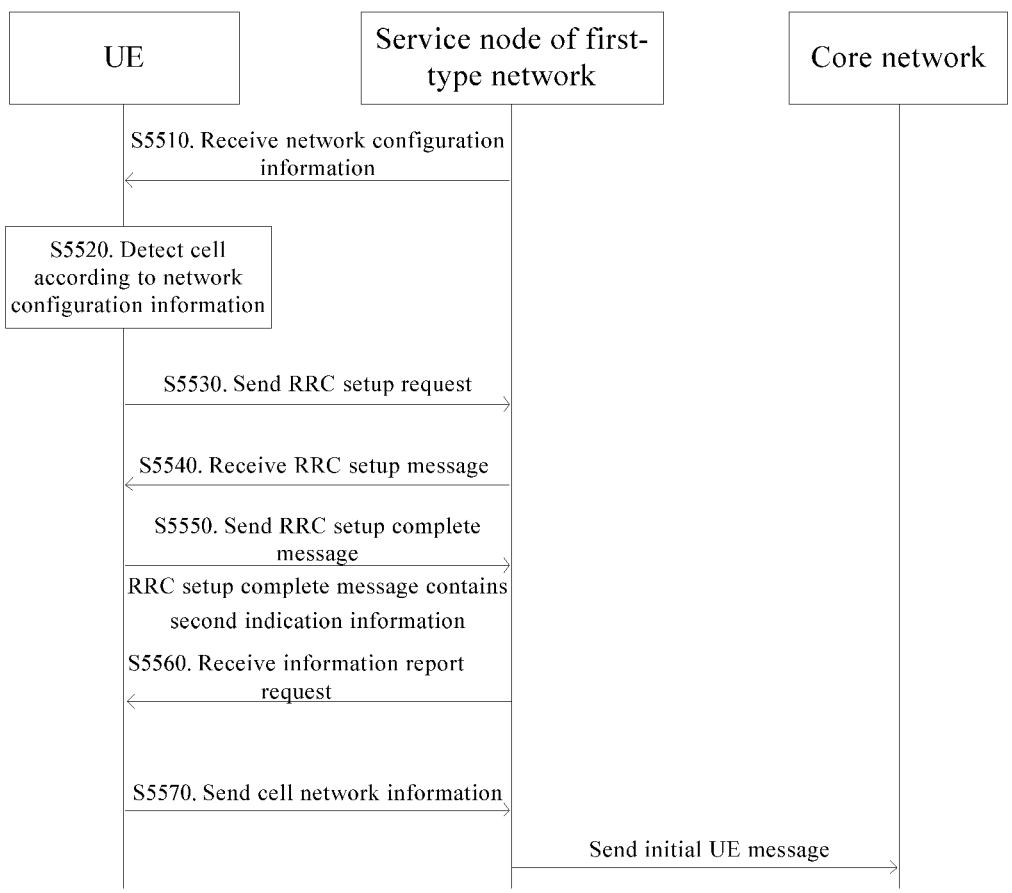
FIG. 12 is a flowchart illustrating implementation of reporting cell network information according to an embodiment.

FIG. 12 is a flowchart illustrating implementation of reporting cell network information according to an embodiment. In this embodiment, the UE receives the network configuration information from a system message or an RRC release message. The network configuration information includes frequency configuration information and time configuration information. As shown in FIG. 12, the step of reporting cell network information to the service node of the first-type network includes steps S5510 to S5570.

At step S5510, receiving network configuration information.

At step S5520, detecting a cell according to the network configuration information.

At step S5530, sending an RRC setup request to a service node.

At step S5540, receiving an RRC setup message fed back from the service node.

At step S5550, sending an RRC setup complete message to the service node. The RRC setup complete message contains second indication information that is configured to indicate that the cell network information is present.

At step S5560, receiving an information report request regarding the second indication information fed back from the service node.

At step S5570, sending the cell network information to the service node according to the information report request.

There may be security risks when the UE reports the cell network information in the RRC setup complete message. In an embodiment, before receiving an information report request regarding the second indication information fed back from the service node, the method further includes: receiving security configuration information sent from the service node. The service node sends the security configuration information before sending an information report request to the UE, thereby improving sending security of the cell network information.

Figure 13:
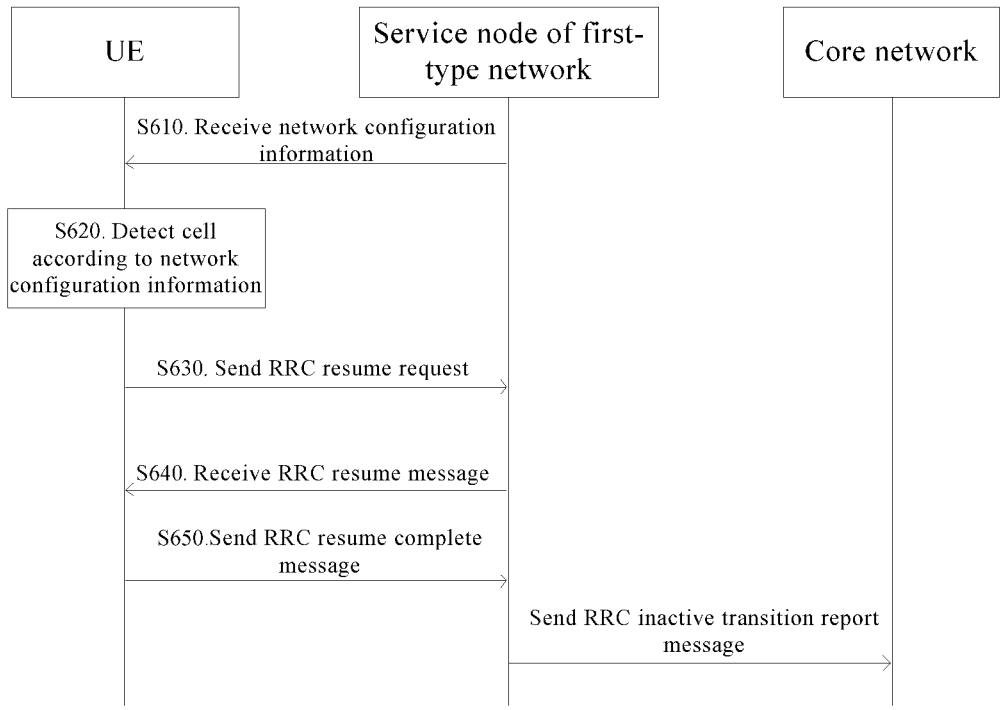
FIG. 13 is a flowchart illustrating implementation of reporting cell network information according to an embodiment.

FIG. 13 is a flowchart illustrating implementation of reporting cell network information according to an embodiment. In this embodiment, the UE is in an RRC_IDLE state, and receives the network configuration information from a system message or an RRC release message. The network configuration information includes frequency configuration information and time configuration information. As shown in FIG. 13, the step of reporting cell network information to the service node of the first-type network includes steps S610 to S650.

At step S610, receiving network configuration information.

At step S620, detecting a cell according to the network configuration information.

At step S630, initiating an RRC resume request to a service node.

At step S640, receiving an RRC resume message fed back from the service node.

At step S650, sending an RRC resume complete message to the service node, the RRC resume complete message containing the cell network information.

In this embodiment, after receiving the cell network information, the service node sends an RRC inactive transition report message to the core network. The RRC inactive transition report message contains the cell network information of the at least one target cell reported by the UE.

In this embodiment, when residing in the first-type network, the UE receives network configuration information sent from a service node. The network configuration information includes frequency configuration information. The UE reports the cell network information of the at least one target cell on the at least one target frequency to the service node, thereby solving the problem that different targeted services and control cannot be provided for the user equipment according to different national boundaries or geographical locations due to the wide deployment range of the first-type network.

Figure 14:
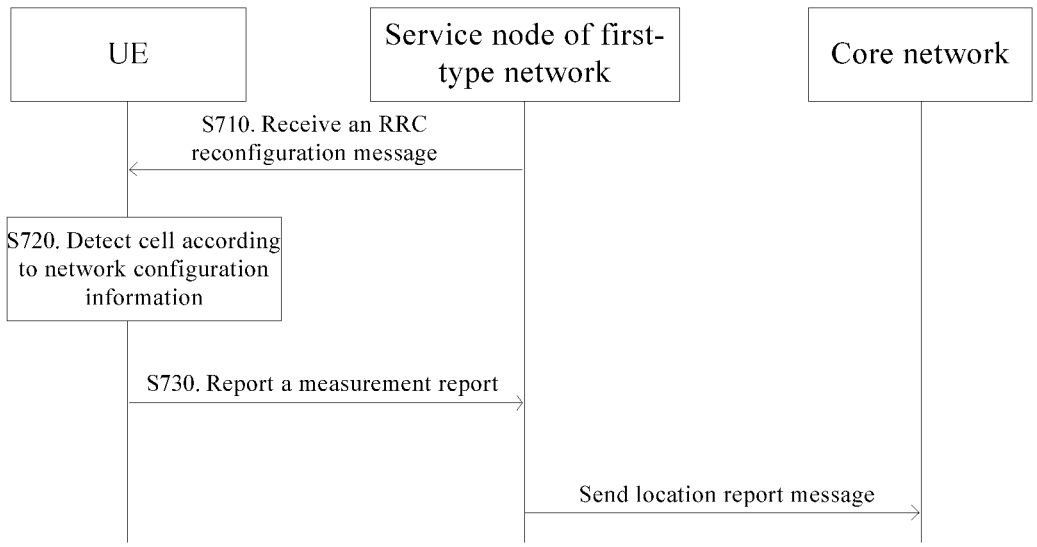
FIG. 14 is a flowchart illustrating implementation of reporting cell network information according to an embodiment.

FIG. 14 is a flowchart illustrating implementation of reporting cell network information according to an embodiment. In this embodiment, the UE is in an RRC_CONNECTED state, and receives the network configuration information from the RRC reconfiguration message. The network configuration information includes frequency configuration information and time configuration information. As shown in FIG. 14, the step of reporting cell network information to the service node of the first-type network includes steps S710 to S730.

At step S710, receiving an RRC reconfiguration message sent from the service node, The RRC reconfiguration message contains network configuration information that includes indication information for reporting the cell network information, and frequency configuration information.

At step S720, detecting a cell according to the network configuration information.

At step S730, reporting a measurement report to the service node. The measurement report contains the cell network information.

In this embodiment, the UE receives the network configuration information from the RRC reconfiguration message. The network configuration information includes configuration information of at least one target frequency, and indication information for reporting the cell network information. The indication information for reporting the cell network information is separately configured for each target frequency, or may be configured uniformly for all target frequencies in the frequency configuration information. In the RRC_CONNECTED state, the UE establishes an RRC with the first-type network (e.g., an NTN network), and the at least one target frequency is a frequency used in the second-type network (such as a TN network). After receiving the network configuration information, the UE measures the configured at least one target frequency according to the network configuration information, and reads, in a case where at least one target cell on the at least one target frequency is measured, a system message of the at least one target cell to acquire the cell network information.

In an embodiment, after receiving the measurement report reported by the UE, the service node sends a location report message to a core network. The location report message contains the cell network information of the at least one target cell reported by the UE.

In an embodiment, the network configuration information may be contained in the measurement configuration of the RRC reconfiguration message. The network configuration information may be configured as an event trigger type (such as a class A event in 4G or 5G) or a periodic trigger type. In the case of the periodic trigger type, the network configuration information further includes time configuration information. The time configuration information is timer configuration information or time interval configuration information.

In an embodiment, according to the event trigger type or periodic trigger type, the UE triggers the measurement report in a related system (e.g., 4G or 5G), and reports the measurement report to the service node after triggering the measurement report.

In this embodiment, when the UE is operating in the first-type network, the UE receives the network configuration information sent from the service node. The network configuration information includes frequency configuration information configured for the second-type network. The UE reports the cell network information of the at least one target cell on the at least one target frequency to the service node. On one hand, it solves the problem that different services and control cannot be provided for the user equipment according to different national boundaries or geographical locations due to the wide deployment range of the first-type network. On the other hand, it enables correct identification of a cell of the second-type network within coverage of the first-type network.

Figure 15:
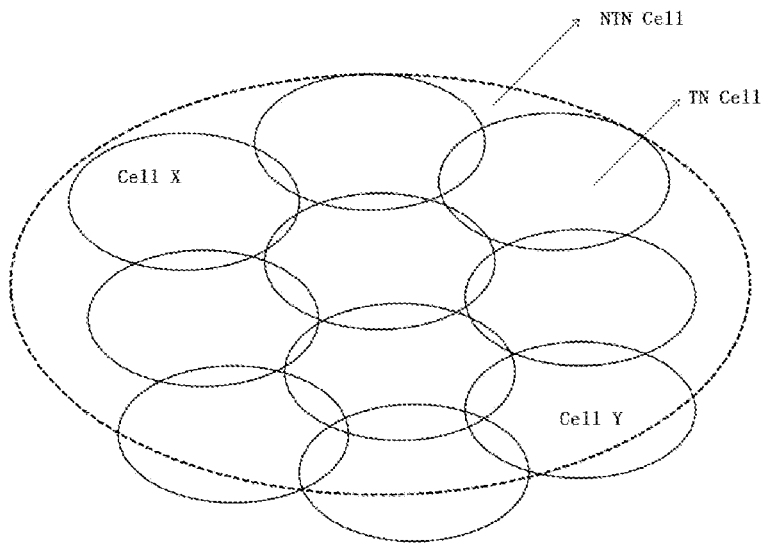
FIG. 15 is a schematic diagram illustrating a deployment of a first-type network and a second-type network according to an embodiment.

FIG. 15 is a schematic diagram illustrating a deployment of a first-type network and a second-type network according to an embodiment. In an embodiment, the first-type network is an NTN network, and the second-type network is a TN network. An NTN cell has a large coverage and includes many TN cells. During deployment of the TN network, since the Physical Cell Identity (PCI) is limited, e.g., with a maximum value of 1008 in a 5G New Radio (NR) network, the operator typically allows repeated PCIs for physical cells of the same frequency only beyond a certain area. In the coverage of the NTN cell shown in FIG. 15, the same frequency and PCI are assigned to a cell X and a cell Y since they are far away from each other. The method of this embodiment is used to correctly identify the cell X and the cell Y.

In an embodiment, the step of receiving network configuration information sent from the service node further includes: receiving measurement control information sent from the service node. The measurement control information is configured to instruct a user equipment to report cell network information. The measurement control information includes at least one of public land mobile network identity report indication information, cell global identity report indication information, tracking area identity report indication information, and assistance information report indication information.

In this embodiment, the UE receives the measurement control information sent from the service node, determines whether to report the cell assistance information according to the received measurement control information, and reports, when determining that the cell assistance information needs to be reported, the measurement report to the service node. The measurement report contains the cell assistance information. The measurement control information sent from the service node is transmitted via a system message or RRC dedicated signaling. The RRC dedicated signaling includes at least one of an RRC reconfiguration message, an RRC resume message, or an RRC release message.

In an embodiment, the cell assistance information report indication is configured to instruct a UE whether to report the cell assistance information. The measurement control information includes at least one of PLMN report indication information, CGI report indication information, TAI report indication information, or assistance information report indication information. When the measurement control information includes assistance information report indication information, the content contained in the assistance information is defined in a protocol. The assistance information report indication may be included in a measurement object, or in report configuration information (Report Config).

In an embodiment, the step of reporting cell network information to the service node includes: report a public land mobile network identity to the service node; or report a cell global identity to the service node; or report a tracking area identity to the service node; or report assistance information to the service node. The assistance information includes at least one of public land mobile network identity information, cell global identity information and cell tracking area identity information.

In an embodiment, the cell assistance information includes at least one of cell PLMN information, cell CGI information and cell TAI information.

In an embodiment, the UE determines whether to report the cell assistance information according to the assistance information report indication information. When determining that the measurement report needs to be reported, the UE determines whether to contain the cell assistance information in the measurement report according to the assistance information report indication information (the determination is not limited to be performed when the UE triggers or reports the measurement report, and may be performed before). The UE determines when to report the measurement report according to a measurement event configured at the network side. The event can be an A-series event (including A1/A2/A3/A4/A5/A6 and the like) or a B-series event (including B1/B2 and the like).

In an embodiment, the UE determining whether to report the cell assistance information according to the received measurement control information may include: the UE determining whether to measure or acquire the cell assistance information according to the cell assistance information report indication information.

In an embodiment, reporting the assistance information to the service node includes: reporting the assistance information for a target cell satisfying a measurement event configured for the service node; or reporting the assistance information for a target cell triggering the measurement report; or reporting the assistance information for all target cells contained in the measurement report. Alternatively, the assistance information is reported for a preset number (e.g., the first n, where n is a predefined value in a protocol or a preconfigured value for the service node) of target cells in the measurement report. The UE reports the assistance information in any of the above manners.

In an embodiment, in the process of reporting the assistance information by the UE, when the measurement report is triggered, the UE reports the assistance information if any valid assistance information is available, and may not carry the assistance information when no valid assistance information is available on the current UE.

In an embodiment, the measurement control information includes range information that in configured to instruct the user equipment to report cell network information satisfying the range information. The measurement control information may include first cell assistance information range information, and the UE reports the assistance information when the measured assistance information of the target cell exceeds the cell assistance information range information.

In an embodiment, the measurement control information includes a first PLMN list (and/or TAI list and/or CGI list), and in the case where the measured assistance information of the target cell is not included in the first PLMN list (and/or TAI list and/or CGI list), the UE triggers reporting of the assistance information and carries the assistance information of the target cell.

In an embodiment, the measurement control information includes second cell assistance information range information, and the UE reports the assistance information when the measured assistance information of the target cell belongs to the cell assistance information range information.

In an embodiment, the measurement control information includes a second PLMN list (and/or TAI list and/or CGI list), and in the case where the measured assistance information of the target cell is included in the second PLMN list (and/or TAI list and/or CGI list), the UE triggers reporting of the assistance information and carries the assistance information of the target cell.

In an embodiment, the assistance information includes cell assistance information function information that includes at least one of a reporting function of cell assistance information and a measurement function of cell assistance information.

In an embodiment, the cell assistance information capability is in information granularity of at least one of:
- user equipment, which indicates that the user equipment supports the cell assistance information function;
- frequency band, which indicates that the user equipment supports the cell assistance information function in this frequency band; and
- band combination, which indicates that the user equipment, when operating in a frequency band of the band combination, supports the cell assistance information function on the frequency band in the band combination;
- frequency band characteristic, which indicates that the user equipment, when operating in the frequency band with the frequency band characteristic, supports the cell assistance information function; and
- supported function, which indicates that the user equipment, when operating in a first-type network, supports the cell assistance information function in a second-type network.

In an embodiment, when the cell assistance information capability is reported per UE (in granularity of UE), it indicates that the UE can support the cell assistance information reporting and/or measurement functions under any condition.

When the cell assistance information capability is reported in granularity of frequency band, it indicates that the UE supports cell assistance information reporting and/or measurement functions on a certain frequency band.

When the cell assistance information capability is reported per band combination, it indicates that the UE, when operating in a certain frequency band, supports the cell assistance information reporting and/or measurement functions on some other specific frequency bands.

When the cell assistance information capability is reported in granularity of frequency band characteristic, it may indicate that the UE, when operating in a certain frequency band type, supports the cell assistance information reporting and/or measurement functions on some certain type of frequency bands. The frequency band characteristic here may be at least one of FR1 frequency band and FR 2 frequency band, or NTN frequency band and TN frequency band.

When the cell assistance information capability is reported in granularity of function, it indicates that the UE, when operating in an NTN cell, supports the cell assistance information reporting and/or measurement functions for TN cells.

Figure 16:
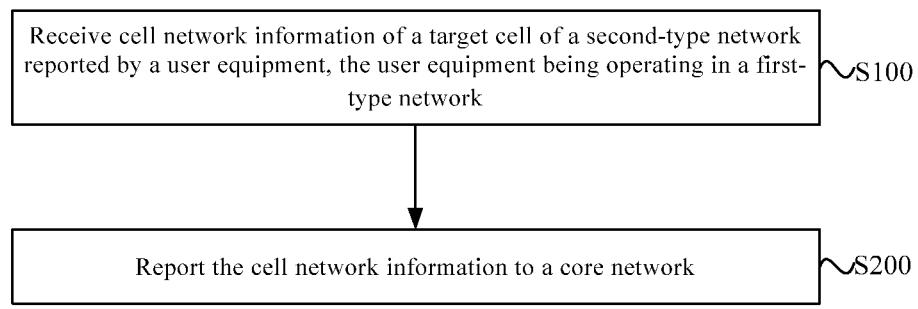
FIG. 16 is a flowchart of a network information reporting method according to an embodiment.

An embodiment of the present application further provides a network information reporting method applied to a service node. FIG. 16 is a flowchart of a network information reporting method according to an embodiment. As shown in FIG. 16, the method provided in this embodiment includes steps S100 to S200.

At step S100, receiving cell network information of a target cell of a second-type network reported by a user equipment, the user equipment being operating in a first-type network.

At step S200, reporting the cell network information to a core network.

In this embodiment, the target cell refers to a cell selected through cell selection or cell reselection for cells of a second-type network when the UE is operating in the first-type network. The cell network information includes at least one of a public land mobile network identity, a tracking area identity, a cell global identity and a radio access node area code.

In an embodiment, the cell network information is reported to the service node by the UE using any one of the above network information reporting methods applied to the user equipment. After receiving the cell network information, the service node reports the cell network information to the core network, and the core network performs targeted charging, information control, service provision and the like on the UE according to the cell network information.

In an embodiment, the step of reporting the cell network information to the core network includes: sending an initial user equipment message to the core network, the initial user equipment message containing the cell network information; or, sending an uplink non-access stratum transfer message to the core network, the uplink non-access stratum transfer message containing the cell network information; or, sending a radio resource control inactive transition report message to the core network, the radio resource control inactive transition report message containing the cell network information; or, sending a location report message to the core network, the location report message containing the cell network information; or, sending a path switch request message to the core network, the path switch request message containing the cell network information.

Figure 17:
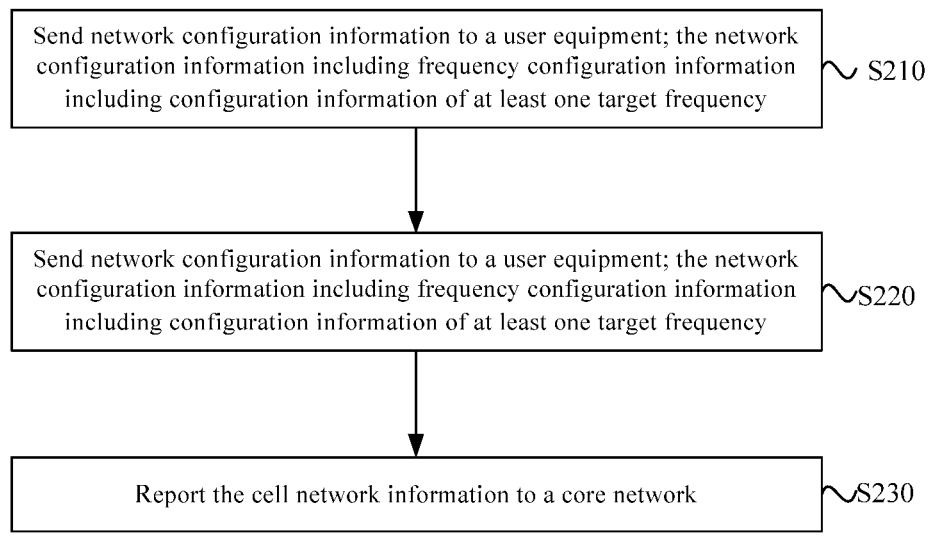
FIG. 17 is a flowchart of a network information reporting method according to an embodiment.

An embodiment of the present application further provides a network information reporting method applied to a service node. FIG. 17 is a flowchart of a network information reporting method according to an embodiment. As shown in FIG. 17, the method provided in this embodiment includes steps S210 to S230.

At step S210, sending network configuration information to a user equipment; the network configuration information including frequency configuration information including configuration information of at least one target frequency.

At step S220, receiving cell network information of a target cell reported by the user equipment; the cell network information including network information corresponding to the detected cell on the target frequency.

At step S230, reporting the cell network information to a core network.

In this embodiment, the target cell refers to at least one target cell measured on at least one target frequency by the UE after measuring the at least one target frequency in the network configuration information sent from the service node. The cell network information includes at least one of a public land mobile network identity, a tracking area identity, a cell global identity and a radio access node area code.

In an embodiment, the cell network information is reported to the service node by the UE using any one of the above network information reporting methods applied to the UE. After receiving the cell network information, the service node reports the cell network information to the core network, and the core network performs targeted charging, information control, service provision and the like on the UE according to the cell network information.

Figure 18:
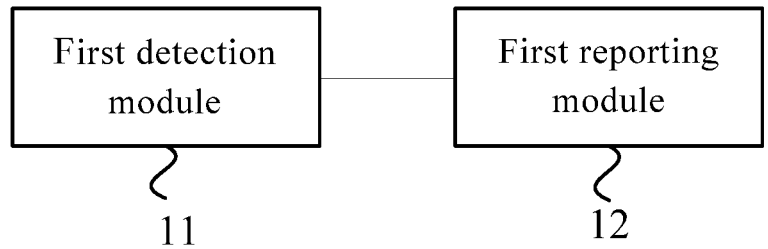
FIG. 18 is a schematic structural diagram of a network information reporting apparatus according to an embodiment.

FIG. 18 is a schematic structural diagram of a network information reporting apparatus according to an embodiment. An embodiment of the present application further provides a network information reporting apparatus, including:
a first detection module 11 configured to detect, in a case where a user equipment is operating in a first-type network, a cell of a second-type network; and
a first reporting module 12 configured to report cell network information to a service node of the first-type network. The cell network information includes network information corresponding to a detected target cell of the second-type network.

In an embodiment, the first detection module 11 is specifically configured to perform, in a case where the user equipment is operating in the first-type network, cell selection or reselection on the cell of the second-type network, and take the cell of the second-type network obtained through the cell selection or reselection as the detected target cell of the second-type network.

In an embodiment, the first reporting module 12 is specifically configured to send, in a case where the user equipment is registered in the first-type network or the cell network information is in a to-be-updated state, a registration request to the service node of the first-type network, and report the cell network information through the registration request; and
the step of sending the registration request to the service node of the first-type network and reporting the cell network information through the registration request includes:
sending a radio resource control setup request to the service node of the first-type network;
receiving a setup message fed back from the service node of the first-type network; and
sending a setup complete message to the service node of the first-type network. The setup complete message includes a non-access stratum message containing the cell network information.

In an embodiment, the first reporting module 12 further includes:
a first system message acquiring unit configured to acquire a first system message of the target cell of the second-type network, the first system message containing at least one of a public land mobile network identity, a tracking area identity, a cell global identity and a radio access node area code; and
a state determining unit configured to determine that the cell network information is in the to-be-updated state according to the first system message.

In an embodiment, the first reporting module 12 is specifically configured to:
send a radio resource control setup request to the service node of the first-type network;
receive a setup message fed back from the service node of the first-type network; and
send a setup complete message to the service node of the first-type network, the setup complete message containing the cell network information.

In an embodiment, the first reporting module 12 is specifically configured to:
send a radio resource control setup request to the service node of the first-type network;
receive a setup message fed back from the service node of the first-type network; and
send a setup complete message to the service node of the first-type network, the setup complete message containing first indication information that is configured to indicate that the user equipment has the cell network information;
receive an information report request regarding the first indication information fed back from the service node of the first-type network; and
send the cell network information to the service node of the first-type network according to the information report request.

In an embodiment, the cell network information includes at least one of a public land mobile network identity, a tracking area identity, a cell global identity and a radio access node area code.

In an embodiment, the first reporting module 12 is specifically configured to:
send, in a case where the cell network information is in a to-be-updated state, a registration request to the service node of the first-type network, and report the cell network information through the registration request, and the step of sending the registration request to the service node of the first-type network and reporting the cell network information through the registration request includes:
  sending a radio resource control resume request to the service node of the first-type network;
  receiving a resume message fed back from the service node of the first-type network; and
  sending a resume complete message to the service node of the first-type network. The resume complete message includes a non-access stratum message containing the cell network information.

In an embodiment, the first reporting module 12 is specifically configured to:
  send, in a case where the cell network information is in a to-be-updated state or radio resource control resume is initiated in the first-type network, a radio resource control resume request to the service node of the first-type network;
  receive a resume message fed back from the service node of the first-type network; and
  send a resume complete message to the service node of the first-type network, the resume complete message containing the cell network information.

In an embodiment, the first reporting module 12 is specifically configured to:
  send, in a case where the cell network information is in a to-be-updated state, a registration request to the service node of the first-type network, and report the cell network information through the registration request, and
  the step of reporting the cell network information through the registration request includes:
  sending an uplink information transfer message to the service node of the first-type network, the uplink information transfer message including a non-access stratum message containing the cell network information.

In an embodiment, the first reporting module 12 is specifically configured to:
  send, in a case where the cell network information is in a to-be-updated state or the user equipment reports location information in the first-type network, a radio resource control message to the service node of the first-type network. The radio resource control message contains the cell network information.

In an embodiment, the first reporting module 12 is specifically configured to:
  receive a radio resource control reconfiguration message sent from the first-type network; and
  send a reconfiguration complete message to the service node of the first-type network. The reconfiguration complete message contains the cell network information.

In an embodiment, the first reporting module 12 is specifically configured to:
  initiate a radio resource control reestablishment request to the service node of the first-type network;
  receive a radio resource control reestablishment message fed back from the service node of the first-type network; and
  send a reestablishment complete message to the service node of the first-type network. The reestablishment complete message contains the cell network information.

In an embodiment, the network information reporting apparatus further includes:
  a receiving unit configured to receive network configuration information sent from the first-type network. The network configuration information includes at least one of indication information for reporting the cell network information, frequency configuration information and time configuration information.

The frequency configuration information includes configuration information of at least one frequency that is configured to instruct a user equipment to detect the target cell of the second-type network on the frequency configured by the frequency configuration information; and
  the time configuration information is timer configuration information or time interval configuration information that is configured to instruct a user equipment to periodically detect the target cell of the second-type network.

Figure 19:
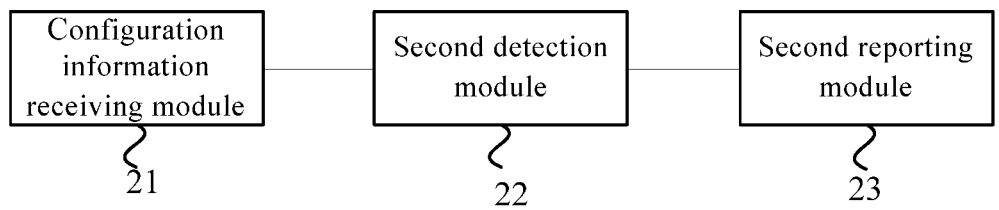
FIG. 19 is a schematic structural diagram of a network information reporting apparatus according to an embodiment.

FIG. 19 is a schematic structural diagram of a network information reporting apparatus according to an embodiment. An embodiment of the present application further provides a network information reporting apparatus, including:
  a configuration information receiving module 21 configured to receive network configuration information sent from a service node, the network configuration information including frequency configuration information including configuration information of at least one target frequency;
  a second detection module 22 configured to detect a cell according to the network configuration information; and
  a second reporting module 23 configured to report cell network information to the service node, the cell network information including network information corresponding to the detected cell on the target frequency.

In this embodiment, detecting the cell according to the network configuration information refers to measuring at least one target frequency in the frequency configuration information, and taking at least one cell on the measured at least one target frequency as the target cell.

In an embodiment, the cell network information includes at least one of a public land mobile network identity, a tracking area identity, a cell global identity and a radio access node area code.

In an embodiment, the configuration information receiving module 21 is specifically configured to:
  receive a second system message sent from the service node, the second system message containing the network configuration information, or, receive a radio resource control release message sent from the service node; the radio resource control release message containing the network configuration information, the network configuration information including time configuration information and the frequency configuration information.

In an embodiment, the second reporting module 23 is specifically configured to: initiate a radio resource control setup request to the service node; receive a radio resource control setup message fed back from the service node; and send a setup complete message to the service node. The setup complete message contains the cell network information.

In an embodiment, the second reporting module 23 is specifically configured to: report the cell network information to the service node, including: initiate a radio resource control setup request to the service node; receive a radio resource control setup message fed back from the service node; and send a setup complete message to the service node, the setup complete message containing second indication information that is configured to indicate that the cell network information is present; receiving an information report request regarding the second indication information fed back from the service node; sending the cell network information to the service node according to the information report request.

In an embodiment, the second reporting module 23 is specifically configured to: initiate a radio resource control resume request to the service node; receive a radio resource control resume message fed back from the service node; and send a resume complete message to the service node. The resume complete message contains the cell network information.

In an embodiment, the network configuration information receiving module 21 is specifically configured to:
receive a radio resource control reconfiguration message sent from the service node, the radio resource control reconfiguration message containing the network configuration information, and the network configuration information includes indication information for reporting the cell network information, and frequency configuration information.

In an embodiment, the second reporting module 23 is specifically configured to: report a measurement report to the service node. The measurement report contains the cell network information.

In an embodiment, the network configuration information receiving module 21 is specifically configured to: receive measurement control information sent from the service node. The measurement control information is configured to instruct a user equipment to report cell network information. The measurement control information includes at least one of public land mobile network identity report indication information, cell global identity report indication information, tracking area identity report indication information, and assistance information report indication information.

In an embodiment, the second reporting module 23 is specifically configured to: report a public land mobile network identity to the service node; or report a cell global identity to the service node; or report a tracking area identity to the service node; or report assistance information to the service node. The assistance information includes at least one of public land mobile network identity information, cell global identity information and cell tracking area identity information.

In an embodiment, the cell assistance information includes at least one of cell PLMN information, cell CGI information and cell TAI information.

In an embodiment, the second reporting module 23 is specifically configured to: report the assistance information for a target cell satisfying a measurement event configured for the service node; or report the assistance information for a target cell triggering the measurement report; or report the assistance information for all target cells contained in the measurement report; or report the assistance information for a preset number of target cells contained in the measurement report. The UE reports the assistance information in any of the above manners.

In an embodiment, the measurement control information includes range information that in configured to instruct the user equipment to report cell network information satisfying the range information.

In an embodiment, the assistance information includes cell assistance information function information that includes at least one of a reporting function of cell assistance information and a measurement function of cell assistance information.

In an embodiment, the cell assistance information capability is in information granularity of at least one of:
user equipment, which indicates that the user equipment supports the cell assistance information function;
frequency band, which indicates that the user equipment supports the cell assistance information function in this frequency band; and
band combination, which indicates that the user equipment, when operating in a frequency band of the band combination, supports the cell assistance information function on the frequency band in the combination of frequency band.

Figure 20:
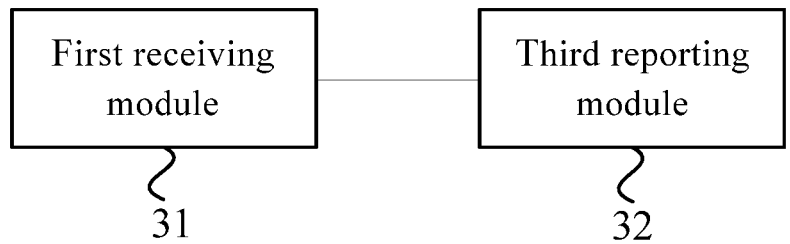
FIG. 20 is a schematic structural diagram of a network information reporting apparatus according to an embodiment.

FIG. 20 is a schematic structural diagram of a network information reporting apparatus according to an embodiment. An embodiment of the present application further provides a network information reporting apparatus, including:
a first receiving module 31 configured to receive, in a case where a user equipment is operating in a first-type network, cell network information of a target cell of a second-type network reported by a user equipment, and
a third reporting module 32 configured to report the cell network information to a core network.

In an embodiment, the third reporting module 32 is configured to: send an initial user equipment message to the core network, the initial user equipment message containing the cell network information; or send an uplink non-access stratum transfer message to the core network, the uplink non-access stratum transfer message containing the cell network information; or send a radio resource control inactive transition report message to the core network, the radio resource control inactive transition report message containing the cell network information; or send a location report message to the core network, the location report message containing the cell network information; or send a path switch request message to the core network, the path switch request message containing the cell network information.

In an embodiment, the network information reporting apparatus further includes:
a sending module configured to send network configuration information to a user equipment, the network configuration information including at least one of indication information for reporting the cell network information, frequency configuration information and time configuration information.

Figure 21:
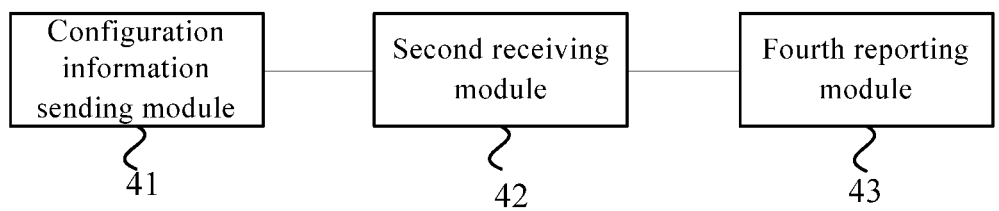
FIG. 21 is a schematic structural diagram of a network information reporting apparatus according to an embodiment.

FIG. 21 is a schematic structural diagram of a network information reporting apparatus according to an embodiment. An embodiment of the present application further provides a network information reporting apparatus, including:
a configuration information sending module 41 configured to send network configuration information to a user equipment, the network configuration information including frequency configuration information including configuration information of at least one target frequency;
a second receiving module 42 configured to receive cell network information of a target cell reported by the user equipment, the cell network information including network information corresponding to the detected cell on the target frequency; and
a fourth reporting module 43 configured to report the cell network information to a core network.

Figure 22:
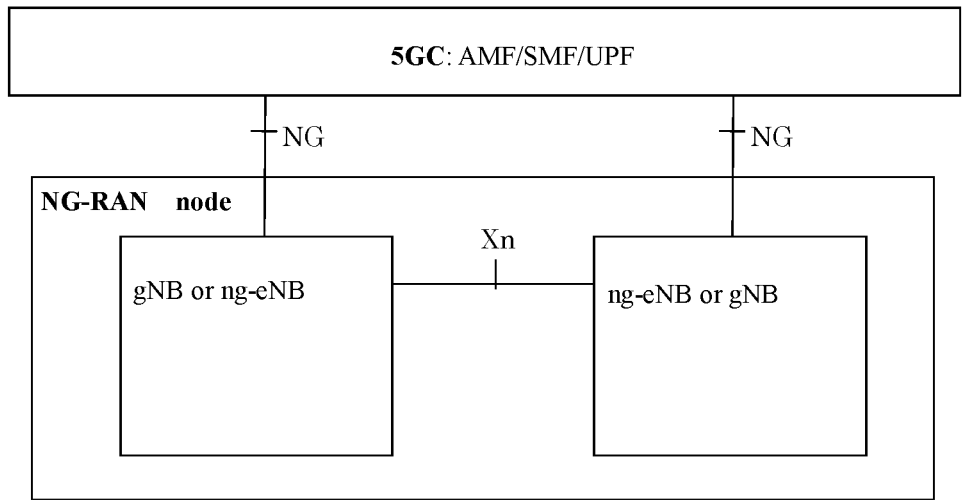
FIG. 22 is a schematic diagram of a 5G network architecture according to an embodiment.

An embodiment of the present application further provides a dual connectivity method. FIG. 22 is a schematic diagram of a 5G network architecture according to an embodiment. As shown in FIG. 22: (NG-RAN) base stations in the Fifth Generation Radio Access Network are connected with each other via NG interfaces and the Fifth Generation Core (5GC), specifically including Next Generation-Control Plane (NG-C) connection between the 5GC and an NG-RAN base station and Next Generation-User Plane (NG-U) connection between the 5GC and an NG-RAN base station, while the NG-RAN base stations are connected with each other via Xn interfaces therebetween, specifically including Xn-Control Plane (Xn-C) connection between the NG-RAN base stations and Xn-User Plane (Xn-U) connection between the NG-RAN base stations. The NG-RAN base station includes at least one of a next Generation Node B (gNB) and a Fifth Generation-evolved Node B (ng-eNB). The 5GC includes at least one of an Access Mobility Function (AMF), a Session Management Function (SMF), and a User Plane Function (UPF). The control plane connection of the above interfaces is configured to transmit control signaling messages between network element nodes; while the user plane connection is configured to transmit user service data. The NG-RAN base station and the served terminal UE are connected to each other via a a radio air interface (i.e., Uu air interface), including an air interface control plane signaling radio bearer (SRB) and an air interface user plane data radio bearer (DRB).

Figure 23:
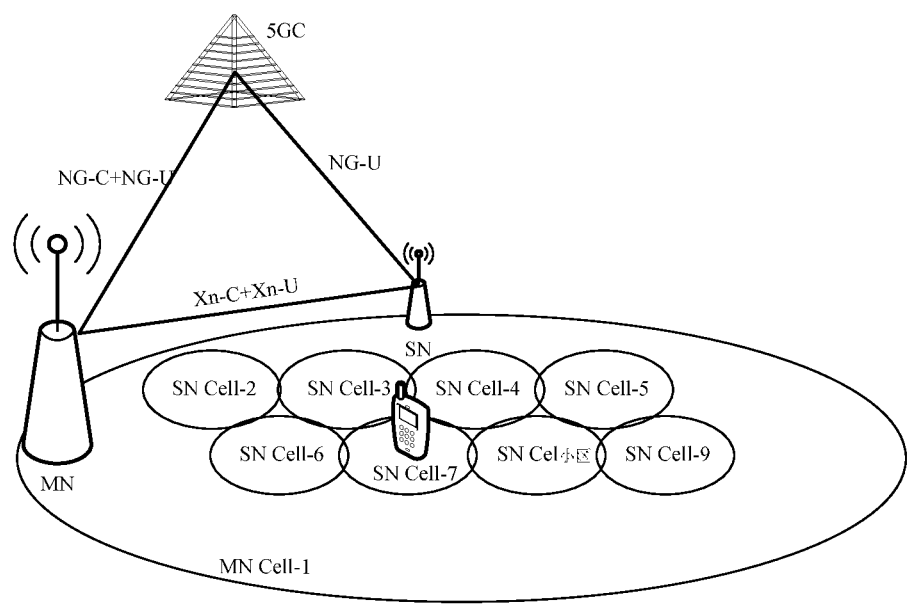
FIG. 23 is a schematic diagram illustrating a dual connectivity operation of a master node master control according to an embodiment.

The 5G system supports a Dual/Multiple Connectivity (DC/MC) operating mode of the UE (this embodiment takes DC as an example for description). FIG. 23 is a schematic diagram illustrating a dual connectivity operation of a master node master control according to an embodiment. In the DC/MC operating mode, as shown in FIG. 23, a Master Node (MN) is typically configured to provide wireless macro coverage within a particular physical area, while a Secondary Node (SN) is configured to provide capacity enhancement in a local hot spot area. When the UE is within an overlapping coverage area of an MN primary serving cell and an SN secondary serving cell, and under the master control of the MN, there will be NG-C and NG-U interface connection between the MN and the 5GC, Xn-C and Xn-U interface connection between the MN and the SN, but only NG-U connection between the SN and the 5GC. Therefore, the entering, exiting and other related operations of the UE in the dual connectivity operating mode are all completed by the master control of the MN. The supported DC/MC operations need to rely on the Xn-C interface between the MN and the SN to complete the related control of the MN to the SN, and perform coordination of resource configuration and update of operating states between each other.

In the conventional land-based cellular mobile system, the geographical location of the base station is fixed once the deployment is completed, and as a result, the radio coverage/capacity of the serving cell provided by the base station over the air interface Uu, and the Xn interface instances connected to neighboring base stations, are also fixed. In recent years, with the advent of various types of moving base stations or network element nodes, such as: terrestrial vehicle-mounted moving base stations, airborne UAV base stations, satellite base stations, or the like, the radio coverage/capacity of the air interface serving cells provided by these moving base stations generally changes continuously with the physical locations of the moving base stations, while the bearer transmission of NG, Xn, or other interfaces connecting these moving base stations can no longer adopt the traditional fixed network transmission mode. That is, bearer transmission cannot be performed through fixed networks such as broadband optical fibers, but usually depends solely on radio bearers, such as: microwave, laser, and other relay technologies. Although having more flexibility in deployment (no need for fixed site resources), such cellular mobile networks constructed with moving base stations can only perform planning and management of the bearer transmission between the network element nodes in a relatively dynamic manner. Otherwise, with movement of the network element nodes, the network topology or environmental conditions may continuously change, causing failure of the original old network element interface connection and configuration, while the new network element interface connection and configuration has not been set up and maintained yet.

Figure 24:
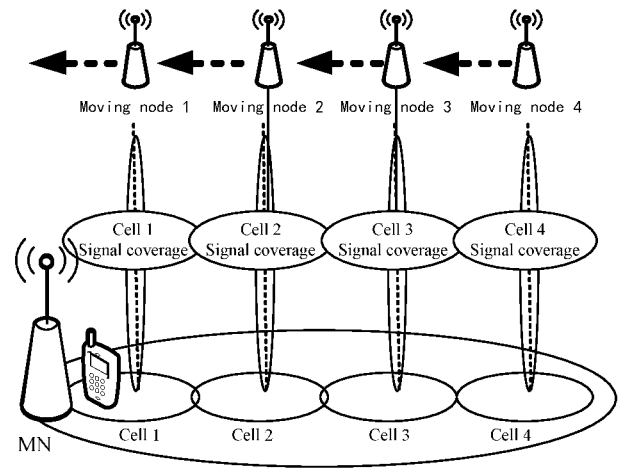
FIG. 24 is a schematic diagram illustrating a change in coverage of a serving cell of a satellite base station according to an embodiment.
Figure 24:
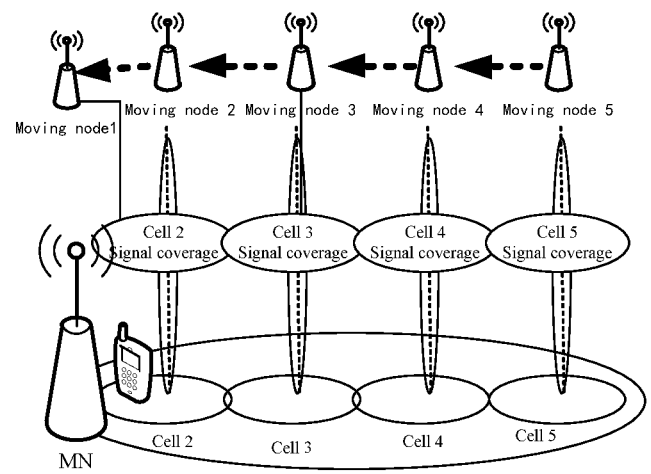

FIG. 24 is a schematic diagram illustrating a change in coverage of a serving cell of a satellite base station according to an embodiment. As shown in FIG. 24: there are several space-based satellite base stations, (moving nodes 1/2/3/4 . . . ), each of which provides a satellite serving beam from the space to a particular terrestrial coverage area to form coverage of the terrestrial serving cells 1/2/3/4 . . . However, as these satellite base stations move to the left along the orbit, the coverage of their respective terrestrial serving cells 1/2/3/4 . . . also moves to the left with the satellite base stations. Assuming that there is further an MN providing coverage of a serving cell A, the relative positional relationship between the cell coverage provided by the satellite base station and the cell coverage provided by the terrestrial MN will change dynamically. Therefore, it may be impossible to set up a stable Xn interface connection between the satellite base station and the terrestrial base station. On one hand, a wireless connection is required between the two, and on the other hand, if the Xn interface connection is to be established between the two, the Xn interface connection will need to be set up, deleted, set up or deleted constantly.

The radio link between the terminal UE and the satellite base station is generally called a service link, which is oriented to the served UE and directly carries user service data and RRC signaling over the 5G NR Uu air interface. From the perspective of the UE, even though it is fixed in place, the service link of the UE will still change accordingly with constant movement of the satellite base station.

Figure 25:
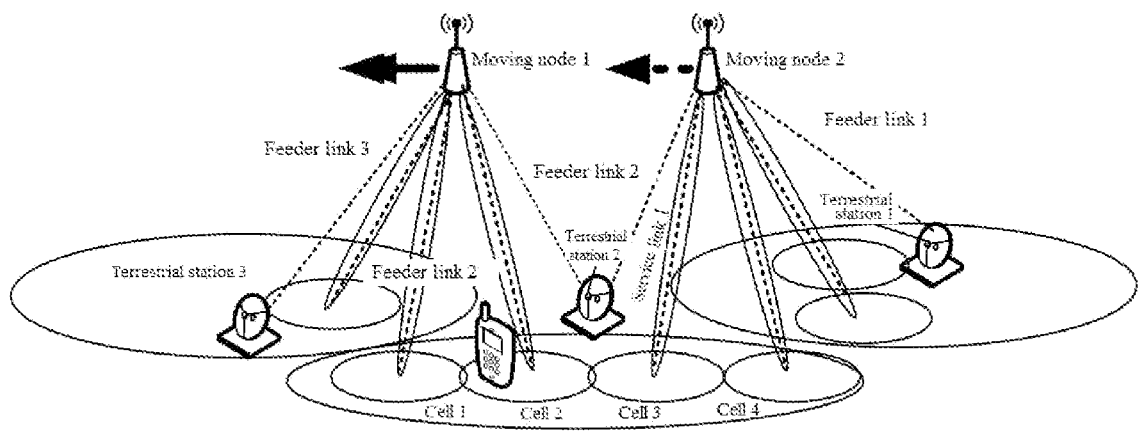
FIG. 25 is a schematic diagram illustrating setup and maintenance of a satellite base station feeder link provided in an embodiment.

FIG. 25 is a schematic diagram illustrating setup and maintenance of a satellite base station feeder link provided in an embodiment. As shown in FIG. 25, the radio link between the satellite base station and the terrestrial station is generally called a feeder link. The feeder link is required to provide at least a transmission function between the satellite base station and the 5GC. In an embodiment, the terrestrial station may be a Non-Terrestrial Network Gateway (NTN-GW), that is, a network element node of the core network. If the satellite base station is a complete gNB, then the feeder link needs to provide stable transmission service for the NG interface, namely, to reliably transmit control signaling and user service data. Although the satellite base station remains in constant high-speed movement, it is usually default that the feeder link between the satellite base station and the NTN-GW may be robust enough. Therefore, a relatively stable NG interface connection instance can be set up, which does not need to be frequently updated and maintained due to multi-hop and relay routing of multiple terrestrial NTN-GW transport layers. For example, in FIG. 25, when the satellite base station Moving Node1 gradually moves leftward from a jurisdiction of terrestrial station 2 to a jurisdiction of terrestrial station 3, through the terrestrial transmission relay between terrestrial stations 2 and 3, it may be default that the NG interface instance between the satellite base station and the core network anchor network element maintains unchanged. Therefore, there is no need to delete the old NG interface connection and rebuild new NG interface connection.

Comprehensively considering characteristics in the UE performing the conventional DC/MC operation (fixed physical locations of master and secondary nodes, fixed and relative robust Xn interface connection, and MN master control), and characteristics in deployment of moving base stations represented by satellite base stations (regular and periodical movement of the satellite base stations along the orbit, and non-fixed and relatively less robust Xn interface connection), if the UE also needs to perform DC/MC operations between a terrestrial fixed base station and a moving satellite base station in the future, it may rely solely on a relatively more stable NG interface since the Xn interface between master and secondary nodes is not reliable. How to acquire related information of UE Dual Connectivity (DC) (especially when dual connectivity of TN/NTN networking depends solely on NG interfaces) is also a problem to be solved.

Figure 26:
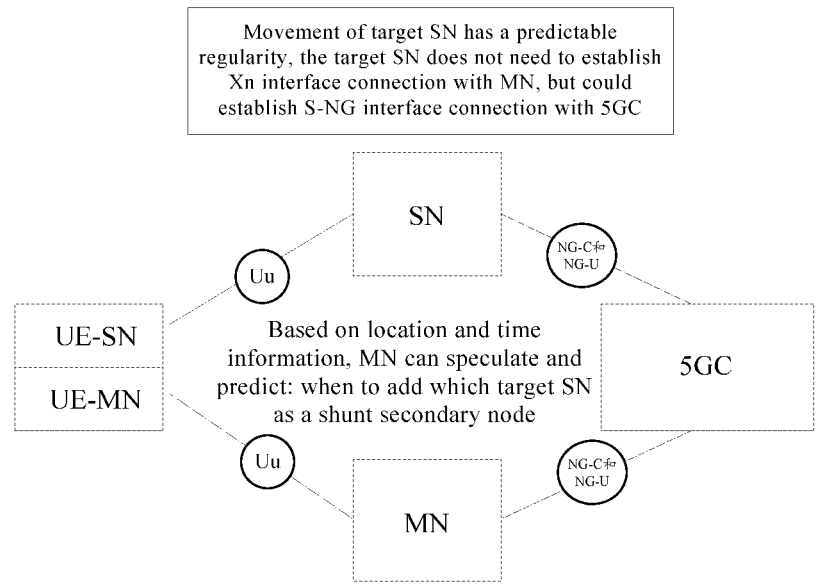
FIG. 26 is a schematic diagram illustrating an architecture of a 5GC master control UE performing a dual connectivity operation according to an embodiment.

FIG. 26 is a schematic diagram illustrating an architecture of a 5GC master control UE performing a dual connectivity operation according to an embodiment. As shown in FIG. 26, the overall radio capability and resource of the UE may be divided into two relatively independent parts, namely the radio capability and resource applicable to an MN (i.e., the UE-MN as shown) and the radio capability and resource applicable to an SN (i.e., the UE-SN as shown). The UE DC information reflects radio capability and resources applicable to the MN and radio capability and resources applicable to the SN when the UE performs the DC operation.

The UE DC information is sent to a gNB by the UE through a UE capability information message or a UE assistance information message.

The UE capability information message carrying the UE DC information is sent when the UE receives a UE capability query message from the gNB instructing that the UE DC information needs to be reported.

The UE assistance information message carrying the UE DC information is sent when the UE receives an RRC reconfiguration message from the gNB instructing that the UE DC information needs to be reported and the UE has not sent the UE DC information to the gNB before or the UE DC information is updated.

The UE DC information is sent to the 5GC by the gNB through a UE Radio Capability Info Indication message or a UE DC information acquisition response message.

The UE Radio Capability Info Indication message carrying the UE DC information is sent when the gNB determines as needed or when the gNB receives a UE DC information acquisition request message from the 5GC. The gNB determines that the UE Radio Capability Info Indication needs to be sent in the case that: an Initial Context Setup Request message does not carry the UE DC information, or the gNB has not sent the UE DC information to the 5GC, or the UE DC information is updated.

The UE DCinformation acquisition response message carrying the UE DC information is sent when the gNB receives a UE DC information acquisition request message from the 5GC.

For the connected UE, the 5GC sends a UE DC information acquisition request message to the gNB when it is determined as needed (e.g., when the 5GC does not have the related UE DC information, or the 5GC suspects that the related UE DC information is not up-to-date).

For the connected UE, the gNB sends a UE capability enquiry message to the UE to indicate that the UE DC information needs to be reported when it is determined as needed (e.g., when the gNB does not have the related UE DC information, or when the gNB determines that the related UE DC information is not up-to-date).

For the connected UE, the gNB sends an RRC reconfiguration message to the UE to instruct that the UE DC information needs to be reported when it is determined as needed (e.g., when the gNB is configured to always obtain the latest related UE DC information in time).

The UE DC information includes: one or more information sets each including at least one of: a Radio Access Technology (RAT) type supported at the MN side, an RAT type supported at the SN side, a Quality of Service (QoS) capability supported at the MN side, a QoS ability supported at the SN side, capability and resource ratios (percentages) supported at the MN side, capability and resource ratios (percentages) supported at the SN side, DRB ID space available at the MN side, DRB ID space available at the SN side, logical channel ID space available at the MN side, logical channel ID space available at the SN side, band combination information available at the MN side, band combination information available at the SN side, and index numbers of information sets.

The RAT type supported at the MN side and the RAT type supported at the SN side include at least one of: an NR, Evolved-UMTS Terrestrial Radio Access (EUTRA), New Radio Low Earth Orbit (NR LEO), New Radio Middle Earth Orbit (NR MEO), New Radio Geostationary Earth Orbit (NR GEO), an NR satellite, and an NR Non-terrestrial and Non-3GPP InterWorking Function (N3IWF). In an embodiment, the N3IWF is, for example, a Wireless Local Area Network (WLAN).

The QoS ability supported at the MN side and the QoS ability supported at the SN side include at least one of: a supported 5G Quality of Service Identifier (5QI), a supported Packet Delay Budget (PDB), whether to support delay critical service, supported uplink and downlink maximum flow bit rates, supported uplink and downlink maximum DRB bit rates, and supported uplink and downlink maximum UE bit rates.

The DRB ID space available at the MN side and the DRB ID space available at the SN side include one of: start and end values of the available DRB IDs, the number of available DRB IDs, a list of available DRB ID values, and the available DRB ID values represented by bit strings.

The logical channel ID space available at the MN side and the logical channel ID space available at the SN side include one of: start and end values of the available logical channel IDs, the number of available logical channel IDs, a list of available logical channel ID values, and the available logical channel ID values represented by bit strings.

Figure 27:
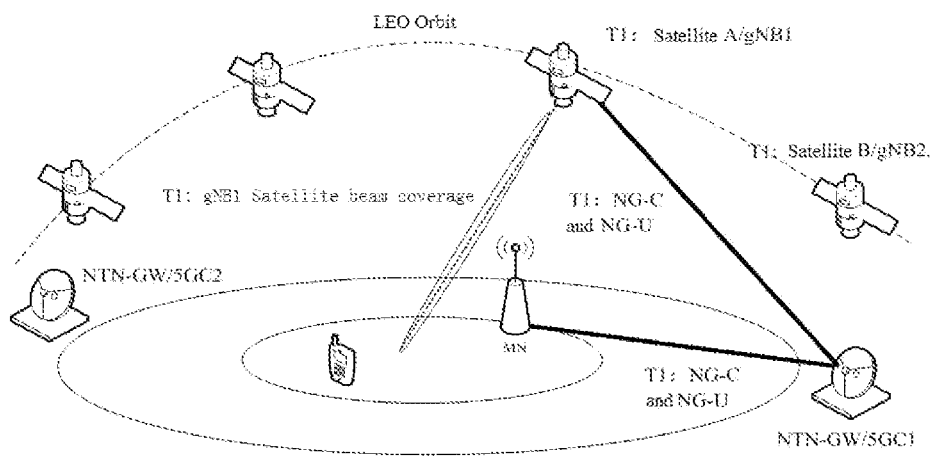
FIG. 27 is a schematic diagram illustrating a dual connectivity operation for a gNB type LEO satellite base station according to an embodiment.

FIG. 27 is a schematic diagram illustrating a dual connectivity operation for a gNB type LEO satellite base station according to an embodiment. As shown in FIG. 27, in a LEO satellite communication system, several LEO satellites periodically orbit the earth on a specific low earth orbit according to predetermined ephemeris information, each of which carries the complete function of a gNB to provide a UE with the satellite radio access service. A plurality of satellite gateways NTN-GWs are deployed on the ground and integrated in a 5GC core network. Depending on its own positioning capability and according to the current operating longitude and latitude positions, each LEO satellite can establish a feeder link with one or more NTN-GWs on the ground respectively in time to bear the NG connection instances. Each LEO satellite projects beam coverage on a predetermined terrestrial area (shown as a larger ellipse, typically having a coverage radius much larger than the coverage of serving cells of a terrestrial base station). As the LEO satellites move, the satellite beam coverage also slides on the ground, and forms pilot frequency overlapping coverage with coverage of serving cells of the terrestrial base station (shown as smaller ellipses).

Figure 28:
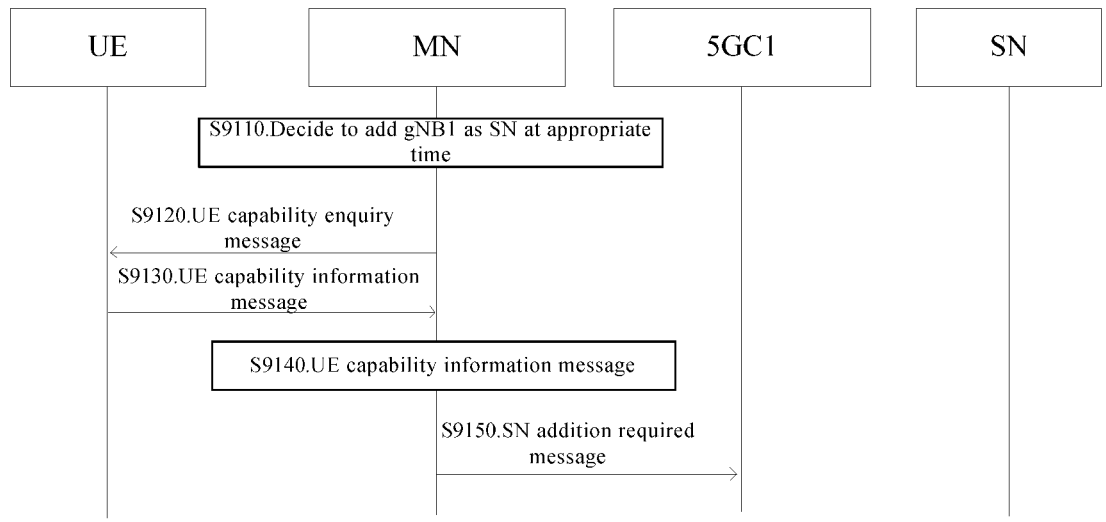
FIG. 28 is a flowchart illustrating implementation of a dual connectivity operation in which an MN triggers addition of an SN according to an embodiment.

FIG. 28 is a flowchart illustrating implementation of a dual connectivity operation in which an MN triggers addition of an SN according to an embodiment. In this embodiment, the method includes steps S9110 to S9150.

At step S9110, at time T1, a satellite base station A (gNB1) is anchored onto NTN-GW/5GC1, while a terrestrial base station gNBx is also connected to 5GC1. Based on the network management system (NMS) configuration information, both gNBx and 5GC1 have ephemeris information for the LEO satellite system (i.e., which LEO satellite will travel to which orbit location at what time and which area its corresponding beam terrestrial coverage is roughly in), and thus, both gNBx and 5GC1 can speculate that: within a certain observation period before and after T1, the terrestrial coverage of the gNB1 beam and the coverage of the gNBx serving cell overlap to some extent, so a ground-to-air dual connectivity operation is possible. Some connected UE is being served by the serving cell of gNBx, and a protocol data unit session (PDU Session1 and PDU Session2), radio resources related to user service data, NG interface connection transmission channels, and the like have been established. Based on the ephemeris information of the LEO low-orbit satellite system, the gNBx (i.e., the MN) can decide to add gNB1 as the SN at the appropriate time.

At step S9120, the MN sends a UE capability enquiry message to the UE to acquire UE DC information.

At step S9130, the UE sends a UE capability information message to the MN, the message carrying UE DC information including one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9140, based on the UE DC information and local policies (such as security or charging policies), the MN determines that user service data of PDU Session1 can be carried and transmitted through the LEO satellite radio link.

At step S9150, the MN sends an SN addition required message to the 5GC1, the message including a request for entirely shunting the PDU Session1, which is currently carrying services at the MN side, to the SN (gNB1).

Figure 29:
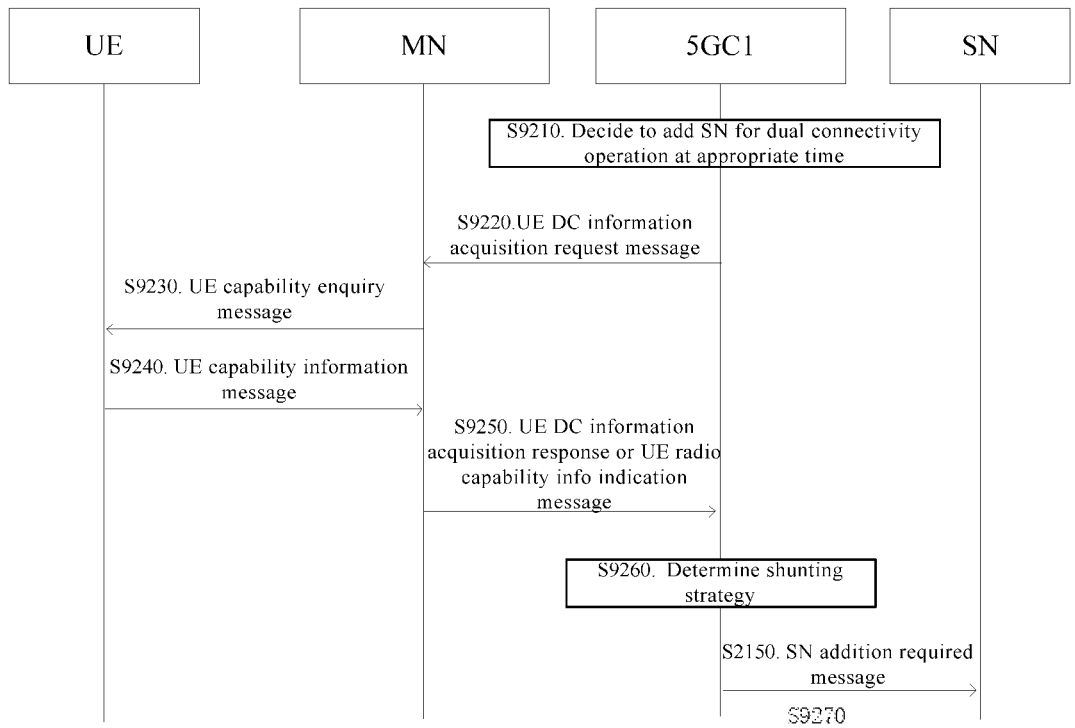
FIG. 29 is a flowchart illustrating implementation of a dual connectivity operation in which a 5GC triggers addition of an SN according to an embodiment.

FIG. 29 is a flowchart illustrating implementation of a dual connectivity operation in which a 5GC triggers addition of an SN according to an embodiment. In this embodiment, the method includes steps S9210 to S9270.

At step S9210, at time T1, a satellite base station A (gNB1) is anchored onto NTN-GW/5GC1, while a terrestrial base station gNBx is also connected to 5GC1. Based on the NMS configuration information, both gNBx and 5GC1 have ephemeris information for the LEO satellite system (i.e., which LEO satellite will travel to which orbit location at what time and which area its corresponding beam terrestrial coverage is roughly in), and thus, both gNBx and 5GC1 can speculate that: within a certain observation period before and after T1, the terrestrial coverage of the gNB1 beam and the coverage of the gNBx serving cell overlap to some extent, so a ground-to-air dual connectivity operation is possible. Some connected UE is being served by the serving cell of gNBx, and the radio resource and NG interface connection transmission channels related to user service data of PDU Session1 and PDU Session2 have been established. Based on the ephemeris information of the LEO low-orbit satellite system, the 5GC1 can decide to add gNB1 as the SN at the appropriate time, i.e., with the gNBx as the MN.

At step S9220, the 5GC1 sends a UE DC information acquisition request message to the MN to acquire UE DC information.

At step S9230, the MN sends a UE capability enquiry message to the UE to acquire UE DC information.

At step S9240, the UE sends a UE capability information message to the MN, the message carrying UE DC information including one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9250, the MN sends a UE DC information acquisition response message, UE Radio Capability Info Indication message, to the 5GC1, which message carries UE DC including: one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9260, based on the UE DC information and local policies (such as security or charging policies), the 5GC1 determines that user service data of PDU Session1 can be carried and transmitted through the LEO satellite radio link.

At step S9270, the 5GC1 sends an SN addition required message to the SN, the message including a request for entirely shunting the PDU Session1, which is currently carrying services at the MN side, to the SN (gNB1).

Figure 30:
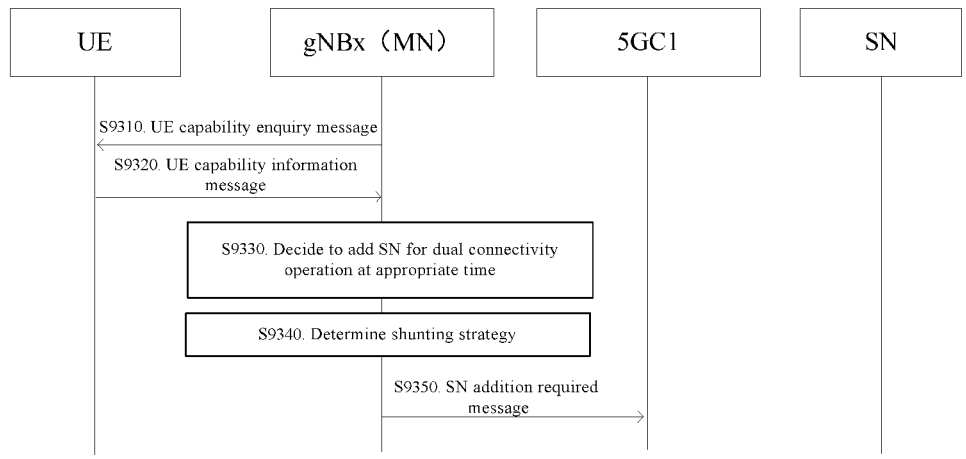
FIG. 30 is a flowchart illustrating implementation of a dual connectivity operation in which an MN triggers addition of an SN according to an embodiment.

FIG. 30 is a flowchart illustrating implementation of a dual connectivity operation in which an MN triggers addition of an SN according to an embodiment. In this embodiment, the method includes steps S9310 to S9350.

At step S9310, some connected UE is being served by the serving cell of gNBx, and the gNBx sends a UE capability enquiry message to the UE to acquire UE DC information.

At step S9320, the UE sends a UE capability information message to the gNBx, the message carrying UE DC information including one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9330, at time T1, a satellite base station A (gNB1) is anchored onto NTN-GW/5GC1, while a terrestrial base station gNBx is also connected to 5GC1. Based on the NMS configuration information, both gNBx and 5GC1 have ephemeris information for the LEO satellite system (i.e., which LEO satellite will travel to which orbit location at what time and which area its corresponding beam terrestrial coverage is roughly in), and thus, both gNBx and 5GC1 can speculate that: within a certain observation period before and after T1, the terrestrial coverage of the gNB1 beam and the coverage of the gNBx serving cell overlap to some extent, so a ground-to-air dual connectivity operation is possible. At this time, the UE has established the radio resource and NG interface connection transmission channels related to user service data of PDU Session1 and PDU Session2. Based on the ephemeris information of the LEO low-orbit satellite system, the gNBx (i.e., the MN) can decide to add gNB1 as the SN at the appropriate time.

At step S9340, based on the UE DC information and local policies (such as security or charging policies), the MN determines that user service data of PDU Session1 can be carried and transmitted through the LEO satellite radio link.

At step S9350, the MN sends an SN addition required message to the 5GC1, the message including a request for entirely shunting the PDU Session1, which is currently carrying services at the MN side, to the SN (gNB1).

Figure 31:
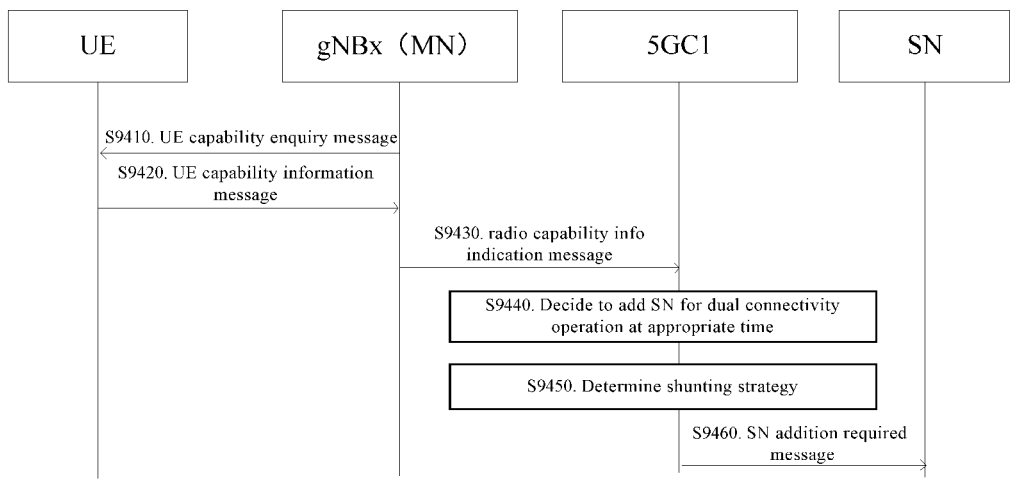
FIG. 31 is a flowchart illustrating implementation of a dual connectivity operation in which a 5GC triggers addition of an SN according to an embodiment.

FIG. 31 is a flowchart illustrating implementation of a dual connectivity operation in which a 5GC triggers addition of an SN according to an embodiment. In this embodiment, the method includes steps S9410 to S9460.

At step S9410, as shown in FIG. 31: some connected UE is being served by the serving cell of gNBx, and the gNBx sends a UE capability enquiry message to the UE to acquire UE DC information.

At step S9420, the UE sends a UE capability information message to the gNBx, the message carrying UE DC information including one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9430, the gNBx sends a UE Radio Capability Info Indication message to the 5GC1, the message carrying UE DC information including one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9440, at time T1, a satellite base station A (gNB1) is anchored onto NTN-GW/5GC1, while a terrestrial base station gNBx is also connected to 5GC1. Based on the NMS configuration information, both gNBx and 5GC1 have ephemeris information for the LEO satellite system (i.e., which LEO satellite will travel to which orbit location at what time and which area its corresponding beam terrestrial coverage is roughly in), and thus, both gNBx and 5GC1 can speculate that: within a certain observation period before and after T1, the terrestrial coverage of the gNB1 beam and the coverage of the gNBx serving cell overlap to some extent, so a ground-to-air dual connectivity operation is possible. At this time, the UE has established the radio resource and NG interface connection transmission channels related to user service data of PDU Session1 and PDU Session2. Based on the ephemeris information of the LEO low-orbit satellite system, the 5GC1 can decide to add gNB1 as the SN at the appropriate time, i.e., with the gNBx as the MN.

At step S9450, based on the UE DC information and local policies (such as security or charging policies), the 5GC1 determines that user service data of PDU Session1 can be carried and transmitted through the LEO satellite radio link.

At step S9460, the 5GC1 sends an SN addition request message to the SN, the message including a request for entirely shunting the PDU Session1, which is currently carrying services at the MN side, to the SN (gNB1).

Figure 32:
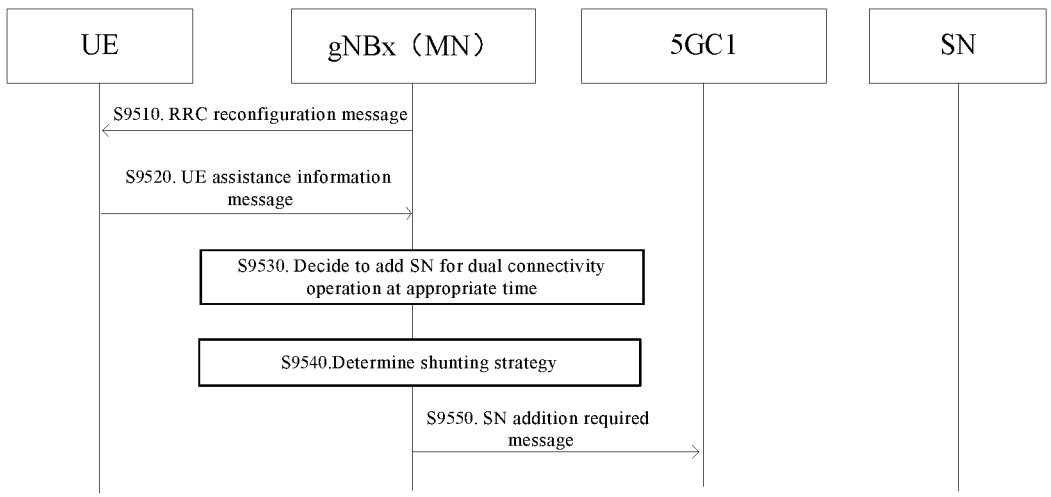
FIG. 32 is a flowchart illustrating implementation of a dual connectivity operation in which an MN triggers addition of an SN according to an embodiment.

FIG. 32 is a flowchart illustrating implementation of a dual connectivity operation in which an MN triggers addition of an SN according to an embodiment. In this embodiment, the method includes steps S9510 to S9550.

At step S9510, some connected UE is being served by the serving cell of gNBx, and the gNBx sends an RRC reconfiguration message to the UE to acquire UE DC information.

At step S9520, when the UE has not sent the UE DC information to the gNBx before or the UE DC information is updated, the UE sends a UE assistance information message to the gNBx, the message carrying UE DC information including: one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9530, at time T1, a satellite base station A (gNB1) is anchored onto NTN-GW/5GC1, while a terrestrial base station gNBx is also connected to 5GC1. Based on the NMS configuration information, both gNBx and 5GC1 have ephemeris information for the LEO satellite system (i.e., which LEO satellite will travel to which orbit location at what time and which area its corresponding beam terrestrial coverage is roughly in), and thus, both gNBx and 5GC1 can speculate that: within a certain observation period before and after T1, the terrestrial coverage of the gNB1 beam and the coverage of the gNBx serving cell overlap to some extent, so a ground-to-air dual connectivity operation is possible. At this time, the UE has established the radio resource and NG interface connection transmission channels related to user service data of PDU Session1 and PDU Session2. Based on the ephemeris information of the LEO low-orbit satellite system, the gNBx (i.e., the MN) can decide to add gNB1 as the SN at the appropriate time.

At step S9540, based on the UE DC information and local policies (such as security or charging policies), the MN determines that user service data of PDU Session1 can be carried and transmitted through the LEO satellite radio link.

At step S9550, the MN sends an SN addition required message to the 5GC1, the message including a request for entirely shunting the PDU Session1, which is currently carrying services at the MN side, to the SN (gNB1).

Figure 33:
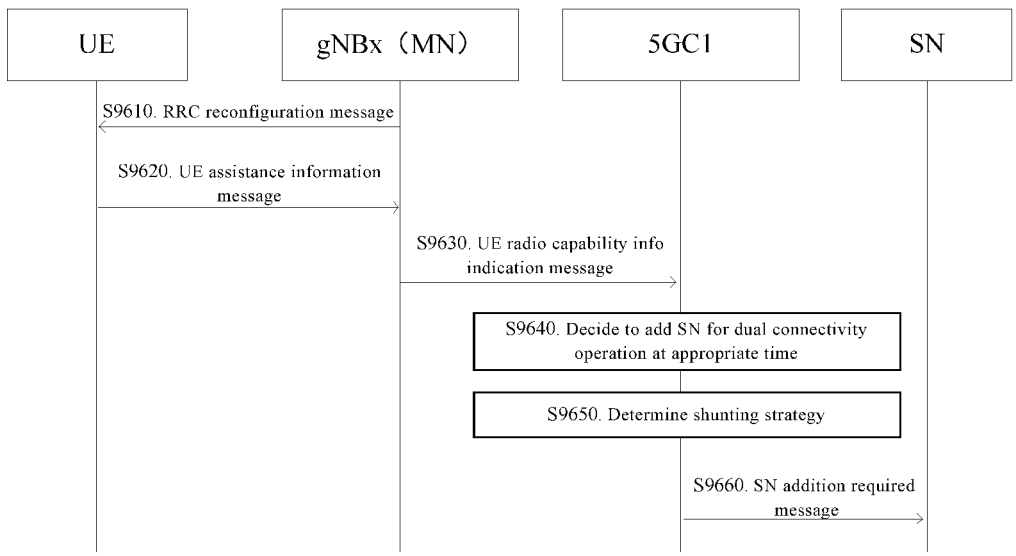
FIG. 33 is a flowchart illustrating implementation of a dual connectivity operation in which a 5GC triggers addition of an SN according to an embodiment.

FIG. 33 is a flowchart illustrating implementation of a dual connectivity operation in which a 5GC triggers addition of an SN according to an embodiment. In this embodiment, the method includes steps S9610 to S9660.

At step S9610, some connected UE is being served by the serving cell of gNBx, and the gNBx sends an RRC reconfiguration message to the UE to acquire UE DC information.

At step S9620, when the UE has not sent the UE DC information to the gNBx before or the UE DC information is updated, the UE sends a UE assistance information message to the gNBx, the message carrying UE DC information including: one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9630, the gNBx sends a UE Radio Capability Info Indication message to the 5GC1, the message carrying UE DC information including one or more information sets each including at least one of: an RAT type supported at the MN side, an RAT type supported at the SN side, a QoS ability supported at the MN side, a QoS ability supported at the SN side, a capability ratio supported at the MN side, a capability ratio supported at the SN side, DRB ID space available at the MN side, DRB ID space available at the SN side, and index numbers of information sets.

At step S9640, at time T1, a satellite base station A (gNB1) is anchored onto NTN-GW/5GC1, while a terrestrial base station gNBx is also connected to 5GC1. Based on the NMS configuration information, both gNBx and 5GC1 have ephemeris information for the LEO satellite system (i.e., which LEO satellite will travel to which orbit location at what time and which area its corresponding beam terrestrial coverage is roughly in), and thus, both gNBx and 5GC1 can speculate that: within a certain observation period before and after T1, the terrestrial coverage of the gNB1 beam and the coverage of the gNBx serving cell overlap to some extent, so a ground-to-air dual connectivity operation is possible. At this time, the UE has established the radio resource and NG interface connection transmission channels related to user service data of PDU Session1 and PDU Session2. Based on the ephemeris information of the LEO low-orbit satellite system, the 5GC1 can decide to add gNB1 as the SN at the appropriate time, i.e., with the gNBx as the MN.

At step S9650, based on the UE DC information and local policies (such as security or charging policies), the 5GC1 determines that user service data of PDU Session1 can be carried and transmitted through the LEO satellite radio link.

At step S9660, the 5GC1 sends an SN addition required message to the SN, the message including a request for entirely shunting the PDU Session1, which is currently carrying services at the MN side, to the SN (gNB1).

An embodiment of the present application further provides a user equipment. The network information reporting method may be executed by a network information reporting apparatus that may be implemented by software and/or hardware and integrated in the user equipment.

Figure 34:
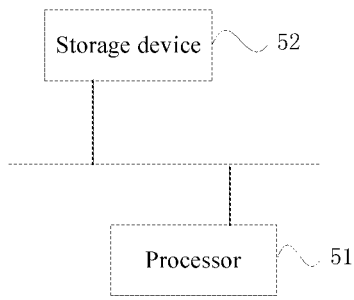
FIG. 34 is a schematic structural diagram of a user equipment according to an embodiment.

FIG. 34 is a schematic structural diagram of a user equipment according to an embodiment. As shown in FIG. 34, this embodiment provides a user equipment, including: a processor 51 and a storage device 52. One or more processors may be provided in the user equipment, and FIG. 34 takes a user equipment 51 as an example. The processor 51 and the storage device 52 in the user equipment may be connected via a bus or by other means, and FIG. 34 illustrates the connection by a bus as an example.

The one or more programs are executed by the one or more processors 51 so that the one or more processors implement the network information reporting method applied to the user equipment according to any of the above embodiments.

As a computer-readable storage medium, the storage device 52 in the user equipment may be configured to store one or more programs which may be software programs, computer-executable programs, and modules, such as the program instructions/modules corresponding to the network information reporting method in the embodiments of the present disclosure (for example, the modules in the network information reporting apparatus shown in FIG. 18, including: the first detection module 11 and the first reporting module 12). The processor 51 executes the software programs, instructions and modules stored in the storage device 52 to perform various functional applications and data processing of the apparatus, i.e., implements the network information reporting method applied to the user equipment described in any of the above embodiments.

The storage device 52 mainly includes a program storage area and a data storage area. The program storage area may store an operating system, or an application program required for at least one function; and the data storage area may store data created according to the use of the apparatus, and the like (such as the cell network information in the above embodiments). Further, the storage means 52 may include a high speed random access memory, and may further include a non-volatile memory, such as at least one magnetic disk memory device, flash memory device, or other non-volatile solid state memory devices. In some examples, the storage means 52 may further include a memory remotely disposed relative to the processor 51, which may be connected to the apparatus via a network. Examples of such networks include, but are not limited to, the Internet, intranets, local area networks, mobile communication networks, and combinations thereof.

Further, when executed by the one or more processors 51, the one or more programs contained in the user equipment implement the network information reporting method applied to the user equipment described in any of the above embodiments.

Technical details that are not described in detail in this embodiment may refer to any of the above embodiments, and this embodiment has the same beneficial effects as performing the network information reporting method.

Figure 35:
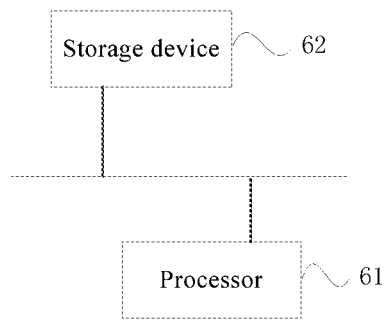
FIG. 35 is a schematic structural diagram of a service node according to an embodiment.

FIG. 35 is a schematic structural diagram of a service node according to an embodiment. As shown in FIG. 35, this embodiment provides a service node, including: a processor 61 and a storage device 62. One or more processors may be provided in the service node, and FIG. 35 takes a service node 61 as an example. The processor 61 and the storage device 62 in the service node may be connected via a bus or by other means, and FIG. 35 illustrates the connection by a bus as an example.

The one or more programs are executed by the one or more processors 61 so that the one or more processors implement the network information reporting method applied to the service node according to any of the above embodiments.

As a computer-readable storage medium, the storage device 62 in the service node may be configured to store one or more programs which may be software programs, computer-executable programs, and modules, such as the program instructions/modules corresponding to the network information reporting method in the embodiments of the present disclosure (for example, the modules in the network information reporting apparatus shown in FIG. 18, including: the first detection module 11 and the first reporting module 12). The processor 61 executes the software programs, instructions and modules stored in the storage device 62 to perform various functional applications and data processing of the apparatus, i.e., implements the network information reporting method applied to the service node described in any of the above embodiments.

The storage device 62 mainly includes a program storage area and a data storage area. The program storage area may store an operating system, or an application program required for at least one function; and the data storage area may store data created according to the use of the apparatus, and the like (such as the cell network information in the above embodiments). Further, the storage device 62 may include a high speed random access memory, and may further include a non-volatile memory, such as at least one magnetic disk memory device, flash memory device, or other non-volatile solid state memory devices. In some examples, the storage device 62 may include a memory remotely disposed relative to the processor 61, which may be connected to the apparatus via a network. Examples of such networks include, but are not limited to, the Internet, intranets, local area networks, mobile communication networks, and combinations thereof.

Further, when executed by the one or more processors 61, the one or more programs contained in the service node implement the network information reporting method applied to the service node described in any of the above embodiments.

Technical details that are not described in detail in this embodiment may refer to any of the above embodiments, and this embodiment has the same beneficial effects as performing the network information reporting method.

An embodiment of the present application further provides a storage medium containing computer-executable instructions, which are configured to, when executed by a computer processor, causes a network information reporting method to be implemented.

In an embodiment, the method includes: detecting, in a case where a user equipment is operating in a first-type network, a cell of a second-type network; and reporting cell network information to a service node of the first-type network, the cell network information including network information corresponding to a detected target cell of the second-type network.

In an embodiment, the method includes: receiving network configuration information sent from a service node, the network configuration information including frequency configuration information including configuration information of at least one target frequency; detecting a cell according to the network configuration information; and reporting cell network information to the service node, the cell network information including network information corresponding to the detected cell on the target frequency.

In an embodiment, the method includes: receiving cell network information of a target cell of a second-type network reported by a user equipment, the user equipment being operating in a first-type network; and reporting the cell network information to a core network.

In an embodiment, the method includes: sending network configuration information to a user equipment, the network configuration information including frequency configuration information including configuration information of at least one target frequency; receiving cell network information of a target cell reported by the user equipment, the cell network information including network information corresponding to the detected cell on the target frequency; and reporting the cell network information to a core network.

Through the description of the above implementations, those skilled in the art may understand that the present disclosure may be implemented by means of software and general hardware, or by hardware. Based on such understanding, the technical solution the present disclosure may be embodied in the form of software products. The computer software product may be stored in a computer readable storage medium, such as a computer floppy disk, a Read-Only Memory (ROM), a Random Access Memory (RAM), a Flash Memory (FLASH), a hard disk or an optical disk, and includes a plurality of instructions for causing a computer device (which may be a personal computer, a server, or a network device, etc.) to perform the method described in any of the embodiments of the present disclosure.

The above are only exemplary embodiments of the present application and not intended to limit the scope of the present application.

The block diagrams of any logic flow in the figures of this application may represent program steps, or may represent interconnected logic circuits, modules, and functions, or may represent a combination of program steps and logic circuits, modules, and functions. The computer program may be stored on a memory. The memory may be of any type suitable to the local technical environment and may be implemented using any suitable data storage technology, such as but not limited to, Read-Only Memories (ROMs), Random Access Memories (RAMs), optical storage devices and systems (Digital Video disks (DVDs), Compact Discs (CDs)), etc. The computer-readable medium may include a non-transitory storage medium. The data processor may be of any type suitable to the local technical environment, such as but not limited to, general purpose computers, dedicated computers, microprocessors, Digital Signal Processors (DSPs), Application Specific Integrated Circuits (ASICs), Field-Programmable Gate Arrays (FGPAs), and processors based on a multi-core processor architecture.

What is claimed is:

1. A network information reporting method, comprising:
   detecting, in a case where a user equipment is operating in a first-type network, a cell of a second-type network; and
   reporting cell network information to a service node of the first-type network, the cell network information comprising network information corresponding to a detected target cell of the second-type network,
   wherein before detecting the cell of the second-type network, the method further comprises:
   receiving network configuration information sent from the first-type network, wherein the network configuration information comprises at least one of indication information for reporting the cell network information, frequency configuration information and time configuration information;
   wherein the frequency configuration information comprises configuration information of at least one frequency that is configured to instruct a user equipment to detect the target cell of the second-type network on the frequency configured by the frequency configuration information; and
   wherein the time configuration information is timer configuration information or time interval configuration information that is configured to instruct a user equipment to periodically detect the target cell of the second-type network.

2. The method according to claim 1, wherein the step of detecting, in the case where the user equipment is operating in the first-type network, the cell of the second-type network comprises:
   performing, in the case where the user equipment is operating in the first-type network, cell selection or reselection on the cell of the second-type network, and taking the cell of the second-type network obtained by the cell selection or reselection as the detected target cell of the second-type network.

3. The method according to claim 2, wherein the step of reporting cell network information to the service node of the first-type network comprises:
sending, in a case where the user equipment is registered in the first-type network or the cell network information is in a to-be-updated state, a registration request to the service node of the first-type network, and reporting the cell network information through the registration request; and
wherein the step of sending the registration request to the service node of the first-type network and reporting the cell network information through the registration request comprise:
sending a radio resource control setup request to the service node of the first-type network;
receiving a radio resource control setup message fed back from the service node of the first-type network; and
sending a radio resource control setup complete message to the service node of the first-type network, the radio resource control setup complete message containing a non-access stratum message which contains the cell network information.

4. The method according to claim 3, wherein before sending the registration request to the service node of the first-type network, the method further comprises:
acquiring a first system message of the target cell of the second-type network, the first system message containing at least one of a public land mobile network identity, a tracking area identity, a cell global identity and a radio access node area code; and
determining that the cell network information is in the to-be-updated state according to the first system message.

5. The method according to claim 2, wherein the step of reporting cell network information to the service node of the first-type network comprises any one of:
a) sending a radio resource control setup request to the service node of the first-type network; receiving a radio resource control setup message fed back from the service node of the first-type network; and sending a radio resource control setup complete message to the service node of the first-type network, the radio resource control setup complete message containing the cell network information;
b) sending a radio resource control setup request to the service node of the first-type network; receiving a radio resource control setup message fed back from the service node of the first-type network; sending a radio resource control setup complete message to the service node of the first-type network, the radio resource control setup complete message containing first indication information that is configured to indicate that the user equipment has the cell network information; receiving an information report request regarding the first indication information fed back from the service node of the first-type network; and sending the cell network information to the service node of the first-type network according to the information report request;
c) sending, in a case where the cell network information is in a to-be-updated state or radio resource control resume is initiated in the first-type network, a radio resource control resume request to the service node of the first-type network; receiving a radio resource control resume message fed back from the service node of the first-type network; and sending a radio resource control resume complete message to the service node of the first-type network, the radio resource control resume complete message containing the cell network information;
d) sending, in a case where the cell network information is in a to-be-updated state or the user equipment reports location information in the first-type network, a radio resource control message to the service node of the first-type network, the radio resource control message containing the cell network information;
e) receiving a radio resource control reconfiguration message sent from the service node of the first-type network; and sending a radio resource control reconfiguration complete message to the service node of the first-type network, the radio resource control reconfiguration complete message containing the cell network information; or
f) initiating a radio resource control reestablishment request to the service node of the first-type network; receiving a radio resource control reestablishment message fed back from the service node of the first-type network; and sending a radio resource control reestablishment complete message to the service node of the first-type network, the radio resource control reestablishment complete message containing the cell network information.

6. The method according to claim 2, wherein the step of reporting cell network information to the service node of the first-type network comprises:
sending, in a case where the cell network information is in a to-be-updated state, a registration request to the service node of the first-type network, and reporting the cell network information through the registration request; and
the step of sending the registration request to the service node of the first-type network and reporting the cell network information through the registration request comprises:
sending a radio resource control to the service node of the first-type network;
receiving a radio resource control resume message fed back from the service node of the first-type network; and
sending a radio resource control resume complete message to the service node of the first-type network, the radio resource control resume complete message containing a non-access stratum message which contains the cell network information.

7. The method according to claim 2, wherein the step of reporting cell network information to the service node of the first-type network comprises:
sending, in a case where the cell network information is in a to-be-updated state, a registration request to the service node of the first-type network, and reporting the cell network information through the registration request; and
the step of reporting the cell network information through the registration request comprises:
sending an uplink information transfer message to the service node of the first-type network, the uplink information transfer message containing a non-access stratum message which contains the cell network information.

8. The method according to claim 1, wherein the cell network information comprising at least one of a public land mobile network identity, a tracking area identity, a cell global identity and a radio access node area code.

9. A user equipment, comprising:
one or more processors; and
a storage device configured to store one or more programs; wherein
the one or more programs are executed by the one or more processors so that the one or more processors implement the network information reporting method according to claim 1.

10. A network information reporting method, comprising:
receiving network configuration information sent from a service node, the network configuration information comprising frequency configuration information, the frequency configuration information comprising configuration information of at least one target frequency;
detecting a cell according to the network configuration information; and
reporting cell network information to the service node, the cell network information comprising network information corresponding to a detected cell on at least one target frequency,
wherein the step of receiving network configuration information sent from the service node comprises:
receiving a second system message sent from the service node, the second system message containing the network configuration information; or
receiving a radio resource control release message sent from the service node; the radio resource control release message containing the network configuration information, and
wherein the network configuration information comprises time configuration information and the frequency configuration information.

11. The method according to claim 10, wherein the cell network information comprises at least one of a public land mobile network identity, a tracking area identity, a cell global identity and a radio access node area code.

12. The method according to claim 10, wherein the step of reporting cell network information to the service node comprises any one of:
a) initiating a radio resource control setup request to the service node; receiving a radio resource control setup message fed back from the service node; and sending a radio resource control setup complete message to the service node, the radio resource control setup complete message containing the cell network information;
b) initiating a radio resource control setup request to the service node; receiving a radio resource control setup message fed back from the service node; sending a radio resource control setup complete message to the service node, the radio resource control setup complete message containing second indication information that is configured to indicate that the cell network information is present; receiving an information report request regarding the second indication information fed back from the service node; and sending the cell network information to the service node according to the information report request; or
c) initiating a radio resource control resume request to the service node; receiving a radio resource control resume message fed back from the service node; and sending a radio resource control resume complete message to the service node, the radio resource control resume complete message containing the cell network information.

13. The method according to claim 10, wherein the step of receiving network configuration information sent from the service node comprises:
receiving a radio resource control reconfiguration message sent from the service node; the radio resource control reconfiguration message containing the network configuration information which comprises indication information for reporting the cell network information, and frequency configuration information.

14. A user equipment, comprising:
one or more processors; and
a storage device configured to store one or more programs; wherein
the one or more programs are executed by the one or more processors so that the one or more processors implement the network information reporting method according to claim 10.

15. A network information reporting method, comprising:
receiving cell network information of a target cell of a second-type network reported by a user equipment, the user equipment being operating in a first-type network; and
reporting the cell network information to a core network,
wherein before receiving cell network information of the target cell of the second-type network reported by the user equipment, the method further comprises:
sending the network configuration information to the user equipment, the network configuration information comprising at least one of indication information for reporting the cell network information, frequency configuration information and time configuration information.

16. The method according to claim 15, wherein the step of reporting the cell network information to the core network comprises:
sending an initial user equipment message to the core network, the initial user equipment message containing the cell network information; or,
sending an uplink non-access stratum transfer message to the core network, the uplink non-access stratum transfer message containing the cell network information; or,
sending a radio resource control inactive transition report message to the core network, the radio resource control inactive transition report message containing the cell network information; or,
sending a location report message to the core network, the location report message containing the cell network information; or,
sending a path switch request message to the core network, the path switch request message containing the cell network information.

17. A service node, comprising:
one or more processors; and
a storage device configured to store one or more programs; wherein
the one or more programs are executed by the one or more processors so that the one or more processors implement the network information reporting method according to claim 15.

* * * * *